(12) United States Patent
Yamada et al.

(10) Patent No.: US 9,467,670 B2
(45) Date of Patent: Oct. 11, 2016

(54) PROJECTION DISPLAY DEVICE

(71) Applicant: MITSUBISHI ELECTRIC CORPORATION, Tokyo (JP)

(72) Inventors: Akihiro Yamada, Tokyo (JP); Tomohiko Sawanaka, Tokyo (JP); Shinji Yagyu, Tokyo (JP); Hiroshi Kida, Tokyo (JP); Kenji Samejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/758,741

(22) PCT Filed: Jan. 9, 2014

(86) PCT No.: PCT/JP2014/000054
§ 371 (c)(1),
(2) Date: Jun. 30, 2015

(87) PCT Pub. No.: WO2014/115493
PCT Pub. Date: Jul. 31, 2014

(65) Prior Publication Data
US 2015/0341605 A1    Nov. 26, 2015

(30) Foreign Application Priority Data

Jan. 23, 2013 (JP) ................ 2013-010380
Jun. 26, 2013 (JP) ................ 2013-134026

(51) Int. Cl.
*G03B 21/14* (2006.01)
*H04N 9/31* (2006.01)
(Continued)

(52) U.S. Cl.
CPC ............. *H04N 9/3164* (2013.01); *F21S 2/00* (2013.01); *G02B 5/0263* (2013.01); *G02B 19/00* (2013.01);
(Continued)

(58) Field of Classification Search
CPC .. G03B 21/005; G03B 21/008; G03B 21/14; G03B 21/208; G03B 21/006; H04N 9/12; H04N 9/3138; H04N 9/3152; G02B 19/0047; G02B 19/0057; G02B 27/30; G02B 27/0927
USPC ................ 353/102, 31, 33, 34, 37
See application file for complete search history.

(56) References Cited

U.S. PATENT DOCUMENTS 5,307,207 A    4/1994  Ichihara
5,634,704 A    6/1997  Shikama et al.
(Continued)

FOREIGN PATENT DOCUMENTS

CN    101405653 A    4/2009
JP     1-259533 A    10/1989
(Continued)

*Primary Examiner* — William C Dowling
(74) *Attorney, Agent, or Firm* — Birch, Stewart, Kolasch & Birch, LLP

(57) ABSTRACT

A projection device includes: first light sources each emitting a first light; a collimator lens that converts the first lights into parallel light beams; a condensing optical system that receives the parallel light beams and emits concentrated light beams; and an optical element having an incident surface through which the concentrated light beams enters the optical element. The condensing optical system is configured so that when a light beam parallel to an optical axis of the condensing optical system is incident on the condensing optical system, the light beam is concentrated at a position on the axis on the incident surface. The parallel light beams are incident at different positions of the condensing optical system while approaching the axis. Emitting positions of the light beams on the condensing optical system and incident positions of the light beams on the incident surface are opposite each other with respect to the axis.

17 Claims, 17 Drawing Sheets

(51) Int. Cl.
　　*G02B 27/30*　　(2006.01)
　　*G02B 19/00*　　(2006.01)
　　*G02B 5/02*　　(2006.01)
　　*G02B 27/09*　　(2006.01)
　　*G02B 27/48*　　(2006.01)
　　*G03B 21/16*　　(2006.01)
　　*G03B 21/20*　　(2006.01)
　　*G03B 33/00*　　(2006.01)
　　*F21S 2/00*　　(2016.01)

(52) U.S. Cl.
　　CPC ....... *G02B 19/0047* (2013.01); *G02B 19/0061* (2013.01); *G02B 27/0927* (2013.01); *G02B 27/30* (2013.01); *G02B 27/48* (2013.01); *G03B 21/14* (2013.01); *G03B 21/16* (2013.01); *G03B 21/208* (2013.01); *G03B 33/00* (2013.01); *H04N 9/3152* (2013.01); *H04N 9/3161* (2013.01); *G02B 27/0994* (2013.01)

(56) References Cited

U.S. PATENT DOCUMENTS

| | | |
|---|---|---|
| 6,443,576 B1 | 9/2002 | Nishida et al. |
| 6,547,400 B1 | 4/2003 | Yokoyama |
| 7,484,850 B2 * | 2/2009 | Sakata ................ G03B 21/006 349/9 |
| 2002/0008791 A1 * | 1/2002 | Okamori ............ G02B 27/0927 349/5 |
| 2004/0141161 A1 | 7/2004 | Hibi et al. |
| 2005/0134804 A1 | 6/2005 | Hashimoto |
| 2005/0280783 A1 | 12/2005 | Yamasaki et al. |
| 2010/0231862 A1 | 9/2010 | Itoh et al. |
| 2011/0261271 A1 | 10/2011 | Yamagishi et al. |
| 2012/0229780 A1 | 9/2012 | Sato |
| 2012/0249972 A1 | 10/2012 | Kurosaki |
| 2013/0286359 A1 * | 10/2013 | Motoya ................ G03B 21/204 353/31 |
| 2013/0308103 A1 | 11/2013 | Yamamoto |
| 2015/0036106 A1 * | 2/2015 | Nagahara ............. G03B 21/208 353/31 |

FOREIGN PATENT DOCUMENTS

| | | |
|---|---|---|
| JP | 7-98479 A | 4/1995 |
| JP | 9-160034 A | 6/1997 |
| JP | 2000-112031 A | 4/2000 |
| JP | 2000-267044 A | 9/2000 |
| JP | 2001-356404 A | 12/2001 |
| JP | 2004-163624 A | 6/2004 |
| JP | 2004-212759 A | 7/2004 |
| JP | 2005-148707 A | 6/2005 |
| JP | 2005-300712 A | 10/2005 |
| JP | 2006-3671 A | 1/2006 |
| JP | 2006-308714 A | 11/2006 |
| JP | 2007-114603 A | 5/2007 |
| JP | 2007-524976 A | 8/2007 |
| JP | 2008-107379 A | 5/2008 |
| JP | 2011-248327 A | 12/2011 |
| JP | 2012-63488 A | 3/2012 |
| JP | 2012-185369 A | 9/2012 |
| JP | 2011-510333 A | 11/2012 |
| TW | 201245845 A1 | 11/2012 |
| WO | WO 2005/084038 A2 | 9/2005 |
| WO | WO 2007/108504 A1 | 9/2007 |
| WO | WO 2009/078941 A1 | 6/2009 |
| WO | WO 2012/108202 A1 | 8/2012 |

\* cited by examiner

FIG. 10
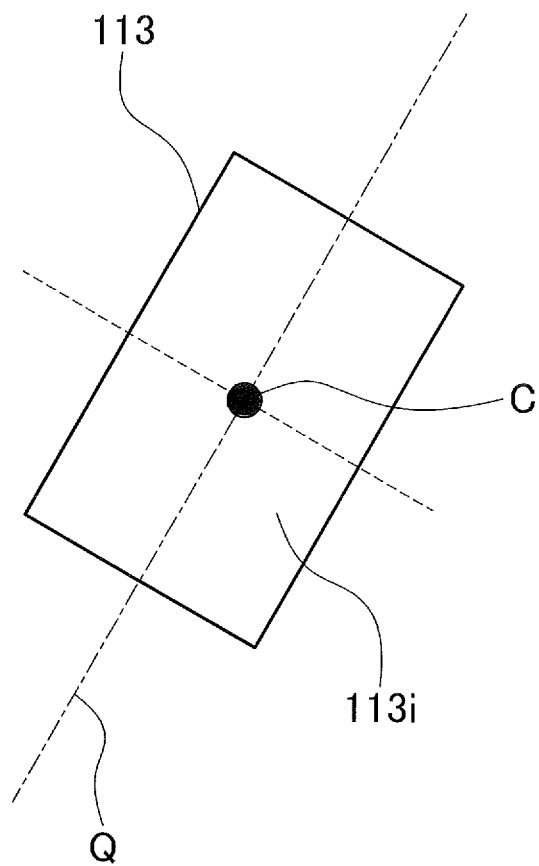
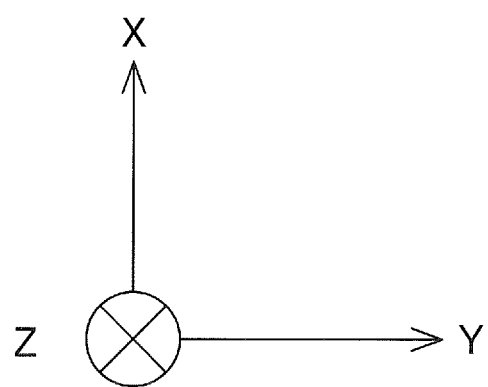

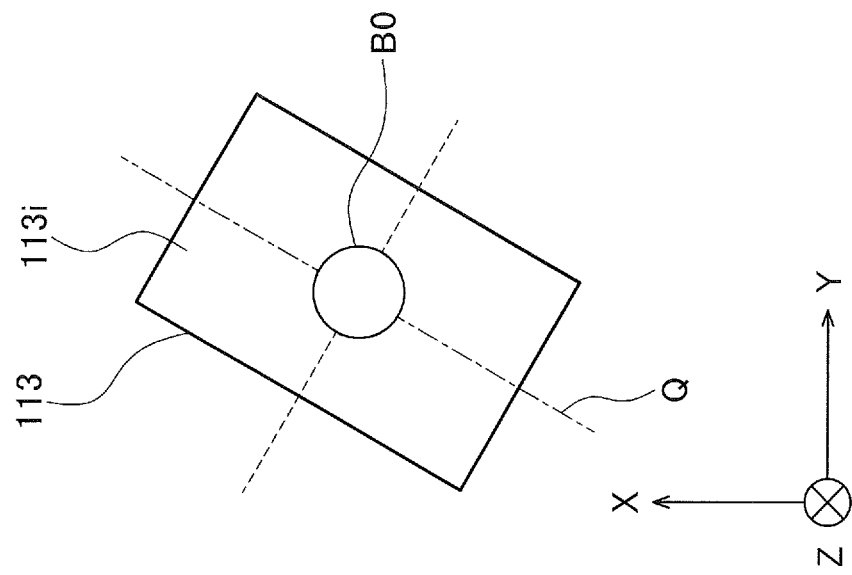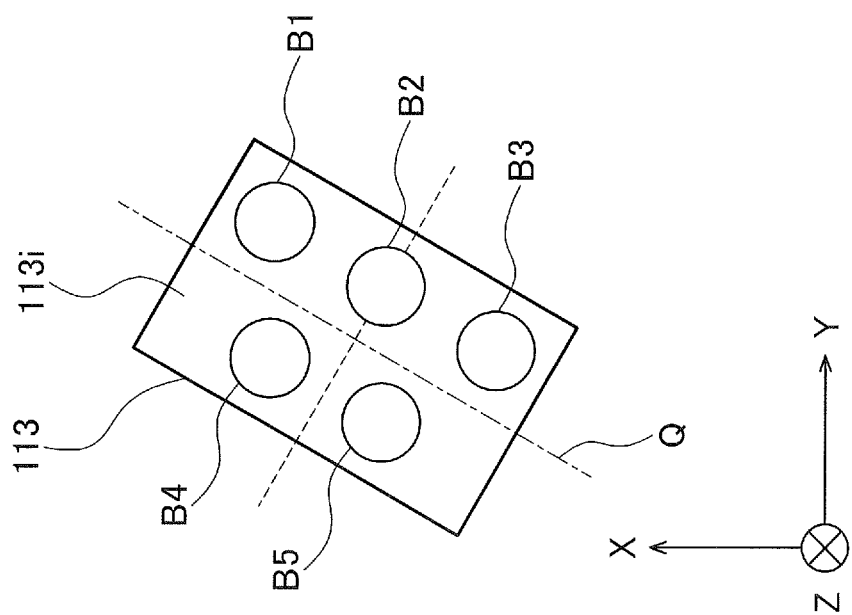

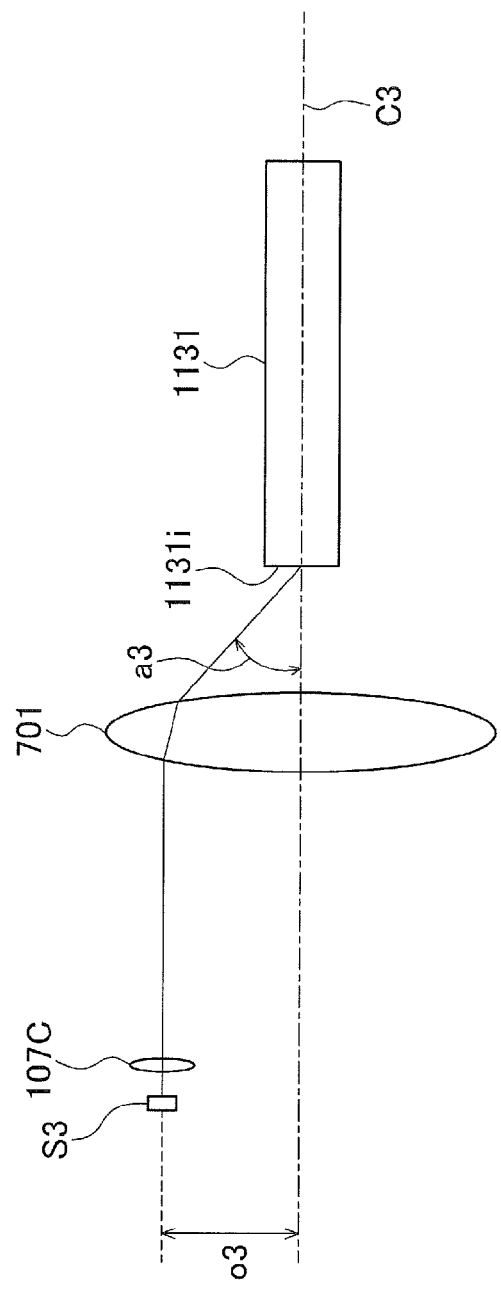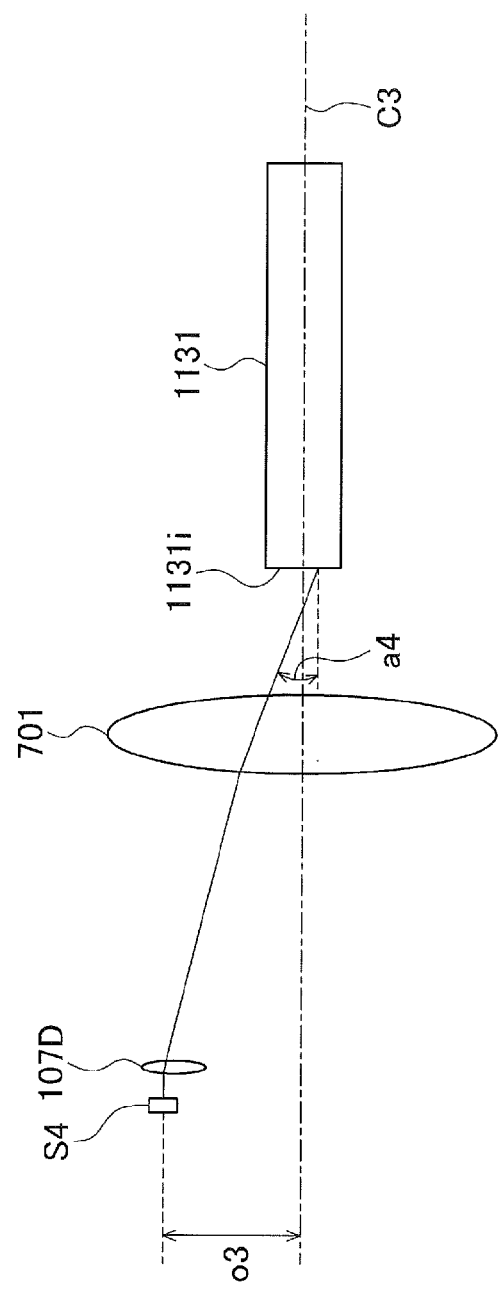
FIG. 13(A)
FIG. 13(B)

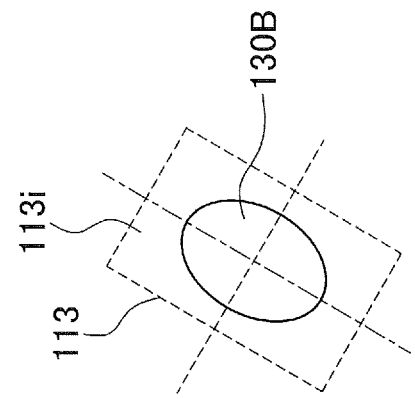
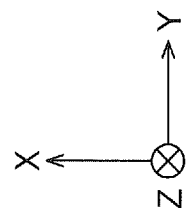
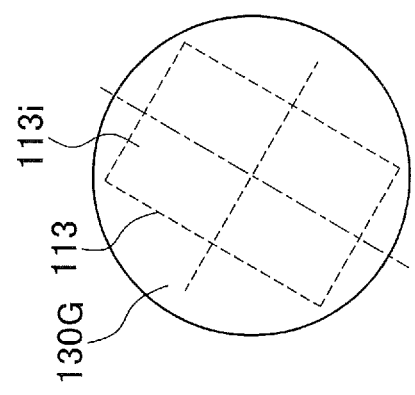
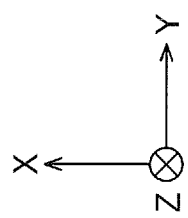
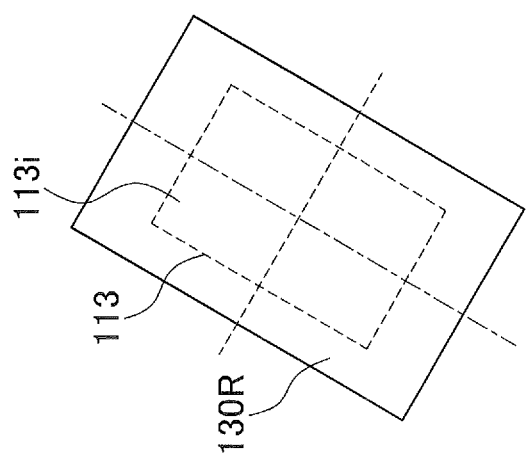
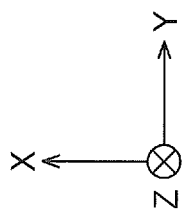

PROJECTION DISPLAY DEVICE

TECHNICAL FIELD

The present invention relates to a projection display device including multiple light sources.

BACKGROUND ART

A projection display device includes a light source system, an illumination optical system, and a projection optical system. "System" refers to a group or mechanism in which individual elements function as a whole while interacting with each other. The light source system emits projection light. The illumination optical system guides the light emitted from the light source system to a light valve. The light valve outputs image light in accordance with an image signal. The projection optical system magnifies and projects the image light onto a screen. Here, "image light" refers to light having image information. "Light valve" refers to an optical shutter that controls transmission or reflection of light. The light valve is, for example, a liquid crystal panel or a digital micro-device (DMD; registered trademark). Conventional mainstream light source systems use pressure mercury lamps or xenon lamps as light sources. Recently, projection display devices using light emitting diodes (LEDs), laser diodes (LDs) (referred to below as lasers), or other light sources are being developed.

In light source systems using LEDs or lasers, since an individual light source is poor in brightness compared to a lamp, it is necessary to use multiple light sources to enhance brightness. For example, Patent Document 1 discloses a projection display device that uses a dichroic mirror to combine lights emitted from multiple LEDs and converge them on the same position of an incident surface of a rod integrator (referred to below as a light intensity equalizing element). Patent Document 2 discloses a projection display device that uses a right-angle prism and a composite rod integrator to combine lights emitted from multiple light sources.

PRIOR ART REFERENCES

Patent References

Patent Document 1: International Publication No. WO 2012/108202 (paragraph 0069, FIG. 1)
Patent Document 1: Japanese Patent Application Publication No. 2011-248327 (paragraph 0009, FIG. 1)

SUMMARY OF THE INVENTION

Problems to be Solved by the Invention

However, if multiple light sources are additionally arranged in a planar manner in the position for the light source in Patent Document 1 or 2 so as to increase brightness, a light beam may be incident on the light intensity equalizing element at an angle not less than an effective angle of the light intensity equalizing element. This is because when multiple light sources are arranged in a planar manner in Patent Document 1 and the light beams from the multiple light sources are concentrated at a center of the light intensity equalizing element, an incident angle of a light beam incident on the light intensity equalizing element becomes large. In this case, there is a problem that use efficiency of light reaching the screen through a projection lens.

Means for Solving the Problems

The present invention has been made to solve the problem as described above, and includes: a light source group including a plurality of first light sources each emitting a first light to be projected; at least one collimator lens that converts the respective first lights into parallel light beams and emits the parallel light beams; a condensing optical system that receives the respective parallel light beams and emits concentrated light beams; and a light intensity equalizing element that receives the concentrated light beams through an incident end surface and emits light having a light intensity distribution with enhanced uniformity. The parallel light beams are incident at different positions of the condensing optical system on a plane perpendicular to an optical axis of the condensing optical system. Emitting positions of the concentrated light beams on an emitting surface of the condensing optical system and incident positions of the concentrated light beams on the incident end surface of the light intensity equalizing element are opposite each other with respect to the optical axis of the condensing optical system.

Effect of the Invention

It is possible to achieve a projection display device having higher brightness and higher light use efficiency.

BRIEF DESCRIPTION OF THE DRAWINGS

FIG. 10 is a schematic diagram of the light intensity equalizing element 113 in the first embodiment as viewed from an incident surface 113*i*.
FIGS. 12(A) and 12(B) are schematic diagrams illustrating incident positions of light beams incident on the incident surface 113*i* of the light intensity equalizing element 113 in the first embodiment.
FIGS. 13(A) and 13(B) are schematic diagrams for explaining light rays incident on a light intensity equalizing element 1131.

FIGS. 15(A), 15(B), and 15(C) are schematic diagrams illustrating illuminance distributions of light beams incident on a rotary diffusion plate.

MODES FOR CARRYING OUT THE INVENTION

A configuration using a laser as a light source also has the following problem. A light source system using a laser generates spotty brightness unevenness called speckle on a screen due to coherence of laser light. For this, Japanese Patent Application Publication No. 2012-185369 (paragraphs 0058 to 0061, FIGS. 3 and 6) discloses a projection display device in which a diffusion plate wheel is disposed on an incident surface side of a light tunnel (also referred to as a rod integrator and hereinafter referred to as a light intensity equalizing element), the diffusion plate wheel including multiple segments that have different diffusivities and arranged in a circumferential direction. With this projection display device, it is possible to make the speckle invisible.

In the following embodiment, by using a rotary diffusion plate 100D or a light diffusion element 1600, it is possible to reduce speckle in coherent light while reducing decrease in light use efficiency.

First Embodiment

Configuration of Projection Display Device

Figure 1:
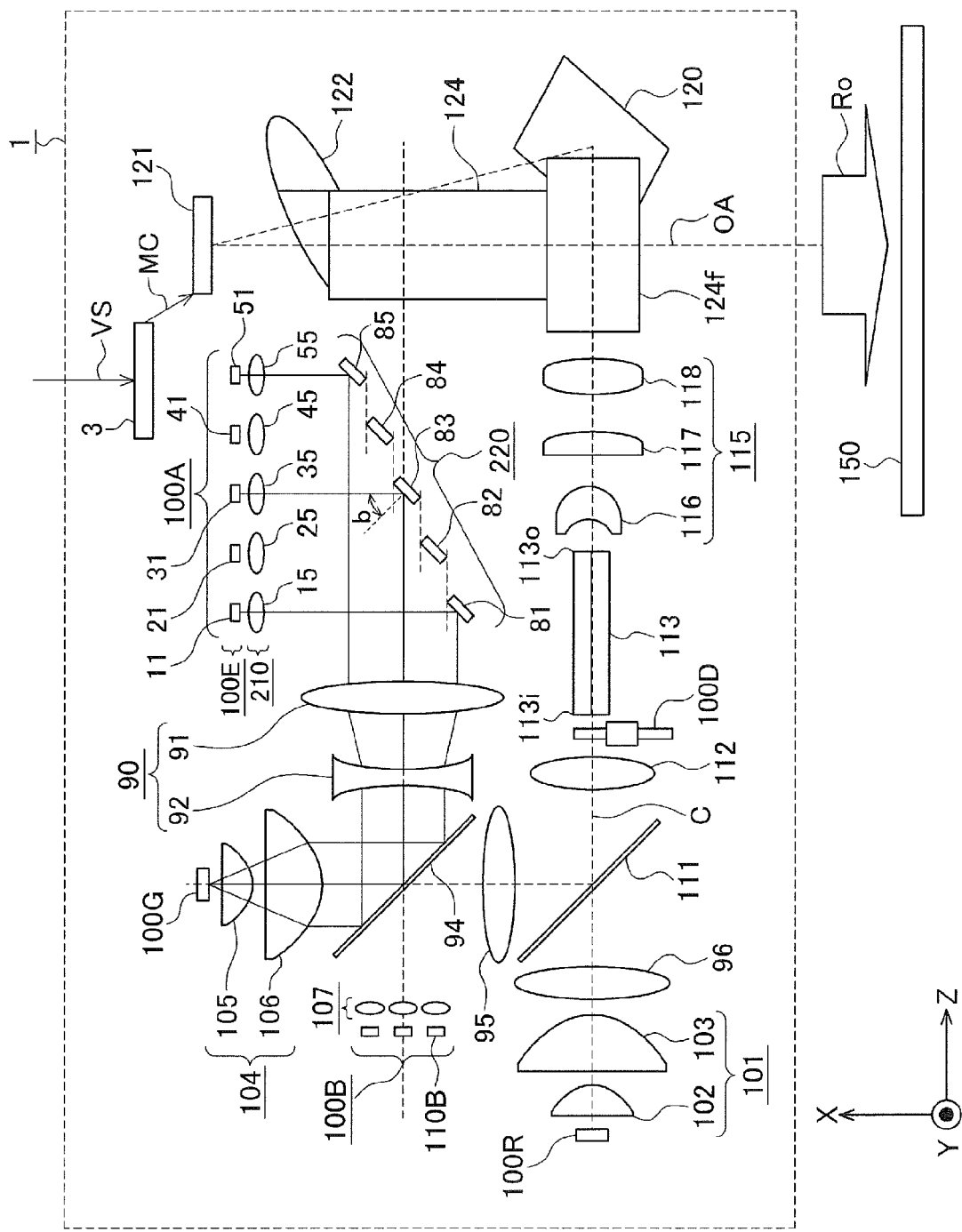
FIG. 1 is a diagram illustrating a configuration of a projection display device in a first embodiment.

FIG. 1 is a configuration diagram schematically illustrating the main components of a projection display device 1 in the first embodiment of the present invention. As illustrated in FIG. 1, the projection display device 1 includes a blue light source group 100B, collimator lenses 107, a condensing optical system 112, and a light intensity equalizing element 113. Further, the projection display device 1 may include a light valve 121 and a projection optical system 124. The projection display device 1 may include the rotary diffusion plate 100D. The projection display device 1 may include a red light source 100R. The projection display device 1 may include an excitation light source unit 100A and a phosphor element 100G. The projection display device 1 may include condensing optical systems 95 and 96. The projection display device 1 may include a relay lens group 115 and a folding mirror 120. The projection display device 1 may include a controller 3 and color separation filters 94 and 111.

XYZ coordinates are used to facilitate explanation of the drawing. FIG. 1 illustrates X, Y, and Z axes perpendicular to each other. The X axis is parallel to an optical axis OA of the projection optical system 124. The −X axis direction is a traveling direction of light in the projection optical system 124; the opposite direction is the +X axis direction. The Y axis is parallel to a height direction of the projection display device 1. The upward direction of the projection display device 1 is the +Y axis direction; the downward direction is the −Y axis direction. The Z axis is parallel to a lateral direction of the projection display device 1. That is, the Z axis is parallel to a width direction of the projection display device 1. In viewing from a direction (the −X axis direction) in which projection light Ro is emitted from the projection display device 1, the right direction is the +Z axis direction; the left direction is the −Z axis direction. A side of the projection display device 1 from which the projection light Ro is emitted will be referred to as "the front side".

The light valve 121 is a reflection type spatial light modulator that spatially modulates a light beam incident from a condensing lens 122. The light valve 121 performs a control of two-dimensionally changing a characteristic of the incident light beam. Here, "characteristic" refers to, for example, a phase, a polarization state, an intensity, or a traveling direction of light. The light valve controls or adjusts light. The light valve is an optical element that controls light from a light source and outputs image light. Here, "image light" refers to light having image information.

The controller 3 generates a modulation control signal MC in accordance with an image signal VS supplied from an external signal source (not illustrated). The controller 3 supplies the modulation control signal MC to the light valve 121. The light valve 121 spatially modulates an incident light beam in accordance with the modulation control signal MC, thereby generating and outputting modulated light. This modulated light is projected onto a projection surface, so that an optical image is displayed. "Modulated light" refers to light obtained by converting an image signal into an optical image to be projected onto a projection surface. "Image light" and "modulated light" are used interchangeably. "Projection surface" refers to, for example, a screen that reflects an image.

In the first embodiment, a digital micro-mirror device (referred to below as DMD; registered trademark) is used as the light valve 121. However, this is not mandatory. For example, a reflective liquid crystal element may be used instead of the DMD.

The projection optical system 124 refracts the modulated light (image light) emitted from the light valve 121 and emits the projection light Ro. The projection light Ro is emitted from a front face 124f of the projection optical system 124 toward the projection surface 150. The projection optical system 124 can magnify and project an optical image represented by the modulated light onto the projection surface 150, which is an external screen or the like. The projection surface 150 is, for example, a screen disposed on the outside. A projection lens magnifies and projects the modulated light. Here, "projection lens" refers to the projection optical system 124.

The excitation light source unit 100A includes multiple excitation light sources 11, 12, 13, 21, 22, 23, 31, 32, 33, 41, 42, 43, 51, 52, and 53 (referred to below as the excitation light source group 100E) arranged in a planar manner. The excitation light source unit 100A further includes collimator lenses 15, 16, 17, 25, 26, 27, 35, 36, 37, 45, 46, 47, 55, 56, and 57 (referred to below as the collimator lens group 210). The collimator lens group 210 is arranged on the −X axis direction side of the excitation light source group 100E. The excitation light source group 100E emits multiple light beams in the −X axis direction. The collimator lens group 210 collimates the multiple light beams emitted from the excitation light source group 100E in the −X axis direction.

In the first embodiment, the excitation light sources 11, 12, 13, 21, 22, 23, 31, 32, 33, 41, 42, 43, 51, 52, and 53 are arranged on an Y-Z plane. Further, in the first embodiment, the excitation light sources 11, 12, 13, 21, 22, 23, 31, 32, 33, 41, 42, 43, 51, 52, and 53 are regularly arranged. For example, multiple blue laser diodes (blue LDs) each emitting laser light within a blue wavelength range is used as the excitation light sources 11, 12, 13, 21, 22, 23, 31, 32, 33, 41, 42, 43, 51, 52, and 53. The blue wavelength range has a peak wavelength of 450 nm. Excitation light sources having a peak wavelength of 405 nm may be used.

Figure 3:
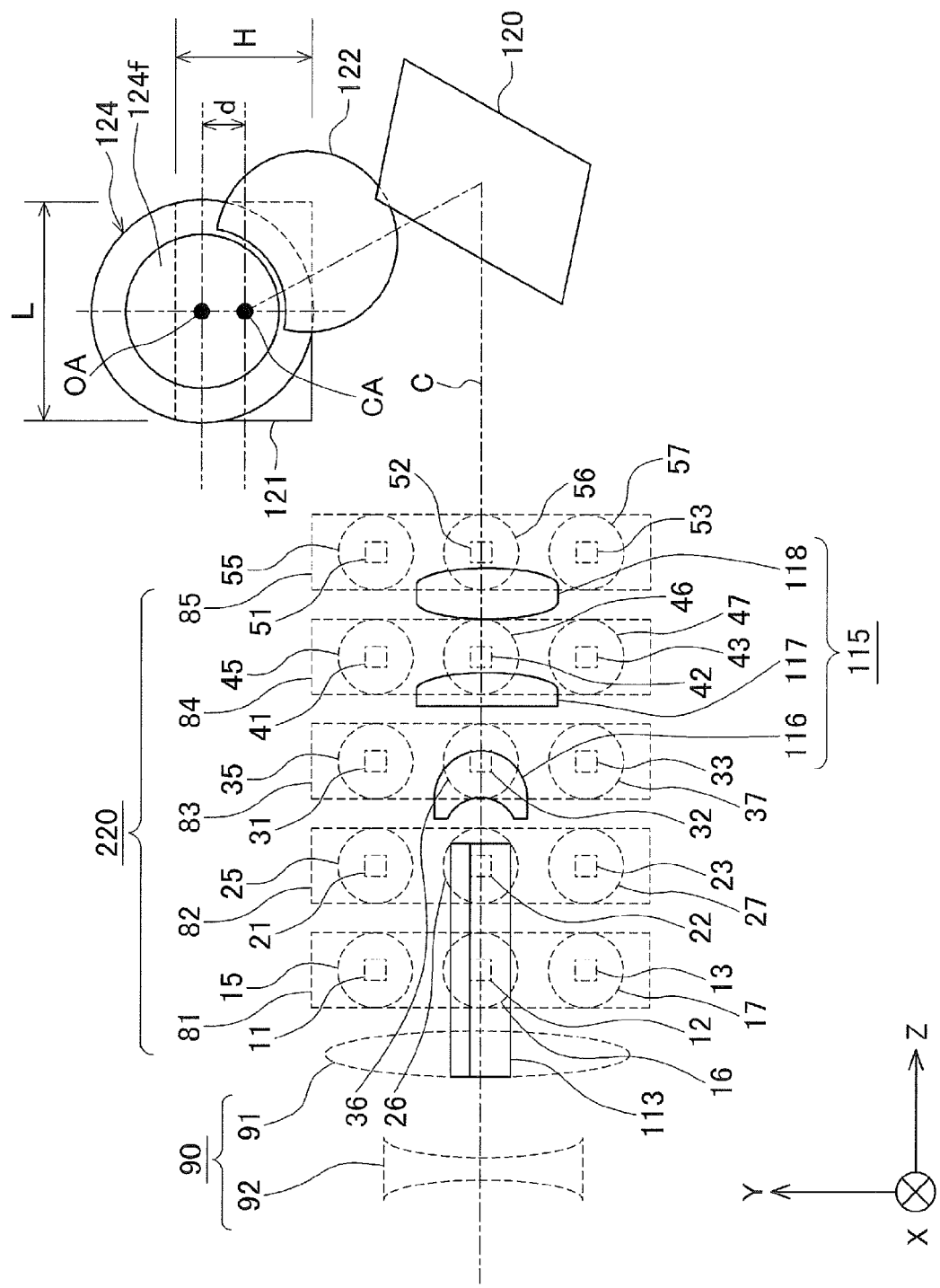
FIG. 3 is a diagram illustrating the configuration of the projection display device in the first embodiment.

As illustrated in FIG. 3, the excitation light source group 100E is arranged on the Y-Z plane in a matrix having three rows and five columns. The excitation light source group 100E and collimator lens group 210 are disposed on the +X axis direction side of the light intensity equalizing element 113 and relay lens group 115. Thus, in FIG. 3, the excitation light source group 100E and collimator lens group 210 are indicated by dashed lines. For the same reason, a lens group 90 is also indicated by dashed lines. The collimator lens group 210 converts the lights emitted from the excitation light source group 100E into parallel light beams and emits them in the −X axis direction. The collimator lens group 210 is disposed on the −X axis direction side of the excitation light source group 100E. The excitation light source unit 100A includes a light reflecting element 80. The light reflecting element 80 includes plate-shaped light reflecting mirrors 81, 82, 83, 84, and 85 (referred to below as the light reflecting mirror group 220). That is, the light reflecting mirrors 81, 82, 83, 84, and 85 are collectively referred to as the light reflecting mirror group 220. The light reflecting element 80 is an element including the light reflecting mirror group 220. Further, in FIG. 3, the light reflecting mirrors 81, 82, 83, 84, and 85 have a rectangular shape long in the Y axis direction. The light reflecting mirrors 81, 82, 83, 84, and 85 reflect the parallel light beams emitted from the collimator lens group 210 toward the lens group 90. The light reflecting mirror group 220 has light reflecting surfaces facing light emitting ends of the excitation light source group 100E. "Light emitting ends" refers to portions emitting lights.

The parallel light beams emitted from the collimator lens group 210 are incident on the light reflecting surfaces of the light reflecting mirror group 220 at incident angles b of 45 degrees. Then, the parallel light beams are reflected in the −Z axis direction and travel toward the lens group 90. The light reflecting mirror group 220 folds the optical paths of the parallel light beams by 90 degrees.

The light reflecting surfaces of the light reflecting mirror group 220 are preferably formed using a silver coating layer so as to efficiently reflect blue light. The first embodiment illustrates an example in which the excitation light sources are arranged in a matrix having three rows and five columns. However, they may be arranged in a matrix having three rows and nine columns. As such, the matrix arrangement is hot limited. "Matrix" has "rows" and "columns", which are two directions perpendicular to each other on a plane. For example, the light sources are arranged at positions at which the "rows" and the "columns" intersect. "Arranged in a matrix" refers to being regularly arranged on a plane.

The incident angles b of the parallel light beams onto the light reflecting element 80 are 45 degrees. The parallel light beams reflected by the light reflecting element 80 travel in a direction parallel to an optical axis of the lens group 90. However, this is not mandatory. For example, the light beams reflected by the light reflecting mirror group 220 may be concentrated toward the optical axis of the lens group 90. This makes it possible to reduce a diameter of a light beam of the light beam group incident on the lens group 90 and improve light concentration efficiency onto the phosphor element 100G. "Diameter of a light beam" refers to a diameter of a cross-section obtained by cutting the light beam group along a plane perpendicular to the optical axis, i.e., a diameter of the light beam group consisting of the light beams emitted from the respective light sources.

In FIG. 1 of the first embodiment, the incident angles b of the parallel light beams on the light reflecting mirrors 81, 82, 83, 84, and 85 are set so that the farther the light reflecting mirror is from the excitation light source group 100E, the smaller the incident angle b is. Specifically, the incident angle b of the parallel light beam on the light reflecting mirror 83, which is disposed on the optical axis of the lens group 90, is 45 degrees. The incident angle b of the light on the light reflecting mirror 81 is less than 45 degrees. The incident angle b of the parallel light beam on the light reflecting mirror 85 is greater than 45 degrees.

The light emitted from the excitation light source 11 is reflected by the light reflecting mirror 81. The light emitted from the excitation light source 21 is reflected by the light reflecting mirror 82. The light emitted from the excitation light source 31 is reflected by the light reflecting mirror 83. The light emitted from the excitation light source 41 is reflected by the light reflecting mirror 84. The light emitted from the excitation light source 51 is reflected by the light reflecting mirror 85. The excitation light source 11 is disposed outermost in the −Z axis direction. The excitation light source 51 is disposed outermost in the +Z axis direction. The excitation light sources 11, 21, 31, 41, and 51 are arranged in this order from the −Z axis direction side to the +Z axis direction side. The distance from the excitation light source 11 to the light reflecting mirror 81 is the greatest. The distance from the excitation light source 51 to the light reflecting mirror 85 is the smallest. The distance from the excitation light source 21 to the light reflecting mirror 82 is the second greatest. The distance from the excitation light source 41 to the light reflecting mirror 84 is the second smallest. The distance from the excitation light source 31 to the light reflecting mirror 83 is the middle of the five distances. The light reflecting mirror 83 is disposed on the optical axis of the lens group 90.

A Light beam incident on a peripheral part of the lens group 90 is susceptible to spherical aberration. Thus, by concentrating the light beams incident on the lens group 90 into an area close to the optical axis of the lens group 90, it is possible to reduce the influence of the spherical aberration and improve light concentration efficiency onto the phosphor element 100G.

As illustrated in FIG. 1, the light reflecting mirror group 220 is arranged in a stepwise manner. As indicated by dashed lines parallel to the Z axis in FIG. 1, the end on the +X axis direction side of the light reflecting mirror 81 and the end on the −X axis direction side of the light reflecting mirror 82 have the same X coordinate; the end on the +X axis direction side of the light reflecting mirror 82 and the end on the −X axis direction side of the light reflecting mirror 83 have the same X coordinate; the end on the +X axis direction side of the light reflecting mirror 83 and the end on the −X axis direction side of the light reflecting mirror 84 have the same X coordinate; the end on the +X axis direction side of the light reflecting mirror 84 and the end on the −X axis direction side of the light reflecting mirror 85 have the same X coordinate.

The end on the +Z axis direction side of the light reflecting mirror 81 and the end on the −Z axis direction side of the light reflecting mirror 82 are spaced from each other. The end on the +Z axis direction side of the light reflecting mirror 82 and the end on the −Z axis direction side of the light reflecting mirror 83 are spaced from each other. The end on the +Z axis direction side of the light reflecting mirror 83 and the end on the −Z axis direction side of the light reflecting mirror 84 are spaced from each other. The end on the +Z axis direction side of the light reflecting mirror 84 and the end on the −Z axis direction side of the light reflecting mirror 85 are spaced from each other. Thereby, the intervals in the X axis direction between the multiple parallel light beams reflected by the light reflecting mirror group 220 can be made narrower than the intervals in the Z axis direction between the multiple light beams emitted from the excitation light source group 100E.

When the ends of two adjacent light reflecting mirrors have the same X coordinate as described above, the interval between the adjacent parallel light beams reflected by the light reflecting mirrors is close to zero. In other words, the ends of the two adjacent light reflecting mirrors have the same coordinate in a direction (in FIG. 1, the X axis direction) perpendicular to the traveling direction (in FIG. 1, the −Z axis direction) of the lights reflected by the light reflecting mirrors, on a plane (in FIG. 1, the Z-X plane) including light rays incident on the light reflecting mirrors and light rays reflected by the light reflecting mirrors. If the ends of two adjacent light reflecting mirrors cannot have the same X coordinate due to assembly or production of parts or other factors, a diameter of a light beam of a light beam group incident on the lens group 90 can be reduced by minimizing the gap.

Thus, even when the excitation light sources are spaced from each other due to constraints of a driving board or the like, a diameter of a light beam reflected by the light reflecting mirrors can be reduced by using the light reflecting mirrors arranged as described above. That is, the lights emitted from the multiple light sources in a dispersed manner can be converted into a condensed light beam by the light reflecting mirrors.

The lens group 90 includes a biconvex lens 91 and a biconcave lens 92. "Biconvex lens" refers to a lens having two convex lens surfaces. "Biconcave lens" refers to a lens having two concave lens surfaces. The lens group 90 receives the parallel light beams reflected by the light reflecting element 80.

The lens group 90 reduces a diameter of a light beam formed of the multiple parallel light beams and then reconverts them into mutually parallel light beams. In FIG. 1, the biconvex lens 91 concentrates the multiple parallel light beams. The biconcave lens 92 converts the multiple parallel light beams into mutually parallel light beams. The lens group 90 includes the biconvex lens 91 and biconcave lens 92. However, the biconvex lens 91 may be replaced with a lens convex on only one side. The biconcave lens 92 may be replaced with a lens concave on only one side. The color separation filter 94 is disposed on the −Z axis direction side of the lens group 90. A condensing lens group 104 is disposed on the +X axis direction side of the color separation filter 94. The phosphor element 100G is disposed on the +X axis direction side of the condensing lens group 104. The parallel light beams emitted from the lens group 90 are reflected by the color separation filter 94, pass through the condensing lens group 104, and then concentrate on the phosphor element 100G. The color separation filter 94 has an optical characteristic of transmitting incident light in a green wavelength range and incident light in a red wavelength range and reflecting incident light in a blue wavelength range. "Wavelength range" refers to a range of wavelengths of light. Different light wavelengths are generally classified as follows: the blue wavelength range is from 430 nm to 485 nm; the green wavelength range is from 500 nm to 570 nm; the red wavelength range is from 600 nm to 650 nm.

For example, the color separation filter 94 can be configured using a dichroic mirror having a dielectric multi-layer film. The condensing lens group 104 includes two convex lenses 105 and 106. The condensing lens group 104 concentrates the parallel light beams reflected by the color separation filter 94 onto the phosphor element 100G.

The phosphor element 100G absorbs the incident light beams as excitation light. Then, the phosphor element 100G outputs a light in the green wavelength range having a main wavelength of 550 nm. As described above, the intervals between the five parallel light beams reflected by the light reflecting mirror group 220 in FIG. 1 are narrower than the intervals between the five light beams emitted from the excitation light source group 100E. Here, "five light beams" refers to, for example, light beams emitted from the excitation light sources 11, 21, 31, 41, and 51. The lens group 90 further narrows the intervals between the multiple parallel light beams reflected by the light reflecting mirror group 220. This reduces a diameter of a light beam formed of the multiple parallel light beams incident on the phosphor element 100G and improves the light concentration efficiency on the phosphor element 100G. The main wavelength of the light in the green wavelength range emitted from the phosphor element 100G is not limited to 550 nm, and may be 520 nm.

The use of such an optical system makes it possible to irradiate the phosphor element 100G with a light beam having a diameter of, for example, 2 mm. For example, a light diffusion element may be disposed between the lens group 90 and the color separation filter 94 so as to equalize the intensity distribution of the light beam concentrated on the phosphor element 100G. The light diffusion element reduces unevenness of light density of the light beam in the position on which the light is concentrated. This reduces temperature rise of the phosphor element 100G, thereby improving conversion efficiency of the phosphor element 100G.

In the first embodiment, the phosphor element 100G is disposed in a fixed manner. However, this is not mandatory. For example, a green phosphor applied to a rotating plate may be used instead of the phosphor element 100G. The green phosphor may be applied to a peripheral part of the rotating plate. This makes it possible to simplify a cooling mechanism. Specifically, the position at which the light is concentrated on the green phosphor is not fixed and continuously changed due to rotation of the rotating plate. Thereby, partial temperature rise of the green phosphor can be prevented.

The condensing lens group 104 collimates the light emitted from the phosphor element 100G and emits it. The light passing through the condensing lens group 104 passes through the color separation filter 94. The condensing optical system 95 is disposed on the −X axis direction side of the color separation filter 94. The color separation filter 111 is disposed on the −X axis direction side of the condensing optical system 95. The condensing optical system 112 is disposed on the +Z axis direction side of the color separation filter 111. The light intensity equalizing element 113 is disposed on the +Z axis direction side of the condensing optical system 112. The rotary diffusion plate 100D is disposed between the condensing optical system 112 and the light intensity equalizing element 113. The light passing through the color separation filter 94 passes through the condensing optical system 95. The light passing through the condensing optical system 95 is reflected by the color separation filter 111. The light reflected by the color separation filter 111 is concentrated by the condensing optical system 112 on an incident end surface 113i of the light intensity equalizing element 113. In a case where the light emitted from the phosphor element 100G is collimated using the two convex lenses, it is preferable in design that the convex lens 106 has an aspherical shape.

The color separation filter 111 has an optical characteristic of transmitting incident light in a red wavelength range. The color separation filter 111 further has an optical characteristic of reflecting incident light in a green wavelength range and incident light in a blue wavelength range. For example, the color separation filter 111 can be configured using a dichroic mirror formed of a dielectric multi-layer film.

The condensing optical system 95 is intended to concentrate the light emitted from the phosphor element 100G onto the light intensity equalizing element 113. Thus, the condensing optical system may be disposed only between the color separation filter 111 and the light intensity equalizing element 113. In this case, the condensing optical systems 95 and 96 are removed, and the condensing optical system 112 needs to be designed in view of red, green, and blue wavelength ranges. In a case where the condensing optical systems 95 and 96 are removed, the condensing optical system 112 is preferably composed of two pieces.

The above-described lens group 90 has a function of collimating an incident light beam, but this is not mandatory. It is only necessary that the blue laser lights are concentrated on the phosphor element 100G by the combination of the lens group 90 and condensing lens group 104. The combination of the condensing lens group 104 and the condensing optical systems 95 and 112 needs to concentrate the light emitted from the phosphor element 100G (the light emitted by the phosphor) onto the incident end surface 113$i$ of the light intensity equalizing element 113. Thus, it is preferable in design that the light beam traveling from the condensing lens group 104 toward the color separation filter 94 is already collimated.

The light intensity equalizing element 113 is an optical element that equalizes a light intensity distribution of an incident light beam. The light intensity equalizing element 113 equalizes a light intensity distribution in a plane perpendicular to an optical axis of the light intensity equalizing element 113. That is, the light intensity equalizing element 113 equalizes a light intensity distribution in a cross-section perpendicular to an optical axis of light incident through the incident end surface 113$i$. Thereby, an illuminance distribution of a light beam incident on the light valve 121 is equalized. The light valve 121 receives the light beam having a uniform light intensity distribution, converts it into modulated light, and emits the modulated light. The light propagating in the light intensity equalizing element 113 is repeatedly totally reflected by an inner surface and thus becomes superposed light in the vicinity of an emitting end surface 113$o$. This can provide a uniform light intensity distribution in the vicinity of the emitting end surface 113$o$. Thus, the emitting end surface 113$o$ of the light intensity equalizing element 113 becomes a surface light source that emits light with uniform brightness.

For example, the light intensity equalizing element 113 is a polygonal column (rod) made of transparent optical material. The transparent optical material may be glass material or transparent resin material. Side surfaces of the polygonal column are used as total reflecting surfaces. The light propagating in the light intensity equalizing element 113 is totally reflected at an interface between the optical material and external air. Alternatively, the light intensity equalizing element 113 is a hollow pipe (light pipe), for example. The hollow portion has side surfaces of light reflecting mirrors. The hollow pipe has a polygonal cross-section. The hollow pipe has light reflecting films that are formed on its side surfaces and reflect light inward.

Figure 2:
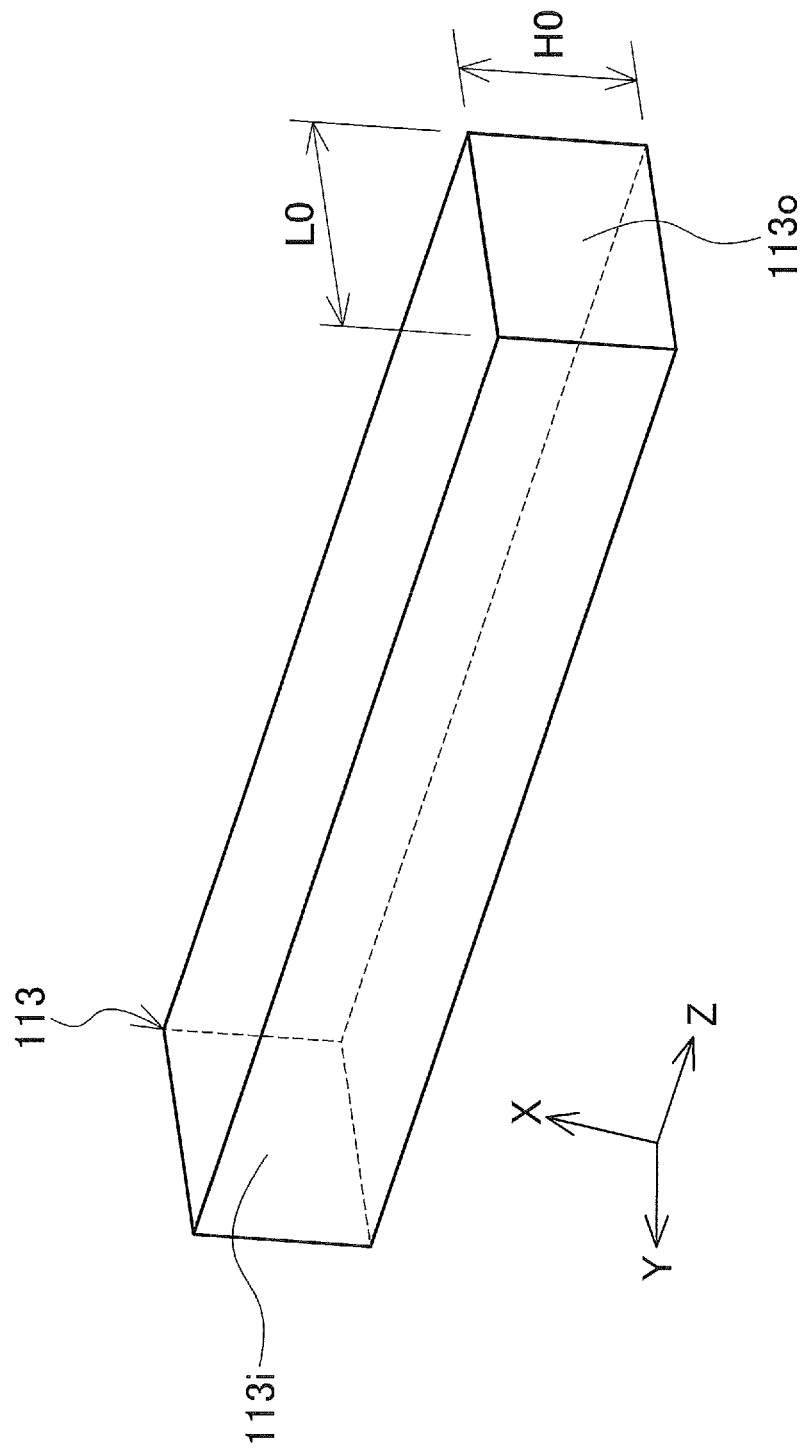
FIG. 2 is a perspective view illustrating a shape of a light intensity equalizing element in the first embodiment.

FIG. 2 is a perspective view illustrating an example of the light intensity equalizing element 113. The light intensity equalizing element 113 illustrated in FIG. 2 is a quadrangular prism having a longitudinal direction in the Z axis direction and a rectangular cross-section in a X-Y plane. Side surfaces thereof are configured to serve as light reflecting mirrors or total reflecting surfaces. Here, "longitudinal direction" refers to a direction parallel to long sides of the quadrangular prism. "Long sides of the quadrangular prism" refers to the longest of the twelve sides of the quadrangular prism. The light intensity equalizing element 113 typically has the four longest sides. The light intensity equalizing element 113 has a column shape. "Column" refers to a tubular spatial figure having two congruent plane figures as bases. A distance between the two bases is referred to as a height of the column. The surfaces of the column other than the bases are referred to as side surfaces. In FIG. 2, the two bases are parallel to a X-Y plane. The direction of the height of the column is the Z axis direction.

In the first embodiment, the emitting end surface 113$o$ of the light intensity equalizing element 113 and a light modulating surface of the light valve 121 are in optically conjugate relation with each other. "Conjugate relation" refers to a relation between an object and an image in an optical system. In the conjugate relation, light emitted from one point concentrates at one point. In the optical system in the first embodiment, an image on the emitting end surface 113$o$ is formed on the light modulating surface of the light valve 121. Thus, in view of light use efficiency, it is preferable that an aspect ratio L:H of the light modulating surface of the light valve 121 is equal to an aspect ratio L0:H0 of the emitting end surface 113$o$ of the light intensity equalizing element 113.

Here, L and L0 denote horizontal dimensions. H and H0 denote vertical dimensions. When the resolution is XGA (the number of horizontal pixels×the number of vertical pixels=1024×768), L:H is typically 4:3. This embodiment assumes that long sides are horizontal and short sides are vertical.

As illustrated in FIG. 1, the relay lens group 115 is disposed on the +Z axis direction side of the light intensity equalizing element 113. The folding mirror 120 is disposed on the +Z axis direction side of the relay lens group 115. The condensing lens 122 is disposed on the +X axis direction side of the folding mirror 120. The light valve 121 is disposed on the +X axis direction side of the condensing lens 122. The relay lens group 115 includes a concave-convex lens (a meniscus lens) 116, a convex lens 117, and a biconvex lens 118. The concave-convex lens is a lens having two lens surfaces one of which is concave and the other of which is convex. The light beam emitted from the emitting end surface 113$o$ of the light intensity equalizing element 113 passes through the relay lens group 115 and reaches the folding mirror 120. The light beam is reflected by the folding mirror 120 toward the light valve 121. The folding mirror 120 has a function of folding the optical path of the light beam. The light beam reflected by the folding mirror 120 passes through the condensing lens 122 and is incident on the light valve 121. A relay optical system guides the light beam having a uniform light intensity distribution to the light valve 121. Here, "relay optical system" refers to an optical system from the relay lens group 115 to the light valve 121.

In FIG. 1, the relay lens group 115 is composed of the three lenses 116, 117, and 118. However, the relay lens group 115 may be composed of two lenses. In this case, it is preferable in design to narrow the interval between the light intensity equalizing element 113 and the folding mirror 120.

The above-described various optical members 104, 94, 95, 111, 112, 113, 115, 120, and 122 constitute a light guiding optical system that guides the light emitted from the phosphor element 100G to the light valve 121. "Light guiding" refers to guiding light. In the first embodiment, the light emitted by the phosphor element 100G is guided from the phosphor element 100G to the light valve 121.

The red light source 100R is composed of a red LED that emits light within a red wavelength range. The red wavelength range has a center wavelength of, for example, 620 nm. The red light emitted from the red light source 100R is converted into parallel light by a lens group 101. The lens group 101 includes two convex lenses 102 and 103. The red light beam emitted from the lens group 101 passes through the condensing optical system 96, color separation filter 111, and condensing optical system 112. In a case where the two convex lenses are used for converting the red light emitted from the red light source 100R into the parallel light, it is preferable in design that the convex lens 103 has an aspherical shape. As illustrated in FIG. 1, the lens group 101 is disposed on the +Z axis direction side of the red light source 100R. The condensing optical system 96 is disposed on the +Z axis direction side of the lens group 101. The color separation filter 111 is disposed on the +Z axis direction side of the condensing optical system 96. The condensing optical system 112 is disposed on the +Z axis direction side of the color separation filter 111.

The red light beam passing through the color separation filter 111 is concentrated by the condensing optical system 112 on the incident end surface 113$i$ of the light intensity equalizing element 113. The red light beam enters the light intensity equalizing element 113 through the incident end surface 113$i$. The light intensity distribution of the incident red light beam is equalized. Then, the equalized red light beam is emitted from the emitting end surface 113$o$. The red light beam emitted from the emitting end surface 113$o$ is incident on the light valve 121 through the relay lens group 115, folding mirror 120, and condensing lens 122.

The condensing optical systems 96 and 112 have a function of concentrating the red light emitted from the red light source 100R on the light intensity equalizing element 113. The condensing optical system may be disposed only between the color separation filter 111 and the light intensity equalizing element 113. In this case, the condensing optical systems 95 and 96 are removed, and the condensing optical system 112 needs to be designed in view of red, green, and blue wavelength ranges. In a case where the condensing optical systems 95 and 96 are removed, the condensing optical system 112 is preferably composed of two pieces.

The blue light source group 100B includes multiple blue lasers 110B each emitting a light within a blue wavelength range. The blue wavelength range has a center wavelength of, for example, 460 nm. The blue lights emitted from the blue light source group 100B are converted into parallel lights by the respective collimator lenses 107 corresponding to the respective light sources. The blue light beams emitted from the collimator lenses 107 are reflected by the color separation filter 94, pass through the condensing optical system 95, and are then reflected by the color separation filter 111. The light source group 100B includes the multiple light sources and emits multiple light beams that become projection light. The collimator lenses 107 convert the multiple light beams into multiple parallel light beams. As illustrated in FIG. 1, the collimator lenses 107 are disposed on the +Z axis direction side of the blue light source group 100B. The color separation filter 94 is disposed on the +Z axis direction side of the collimator lenses 107.

The blue light beams reflected by the color separation filter 111 are concentrated by the condensing optical system 112 on the incident end surface 113$i$ of the light intensity equalizing element 113. The condensing optical system 112 receives the multiple light beams emitted from the collimator lenses 107 and guides them to the light intensity equalizing element 113. The condensing optical system 112 receives the multiple parallel light beams emitted from the collimator lenses 107 and emits multiple concentrated light beams. The multiple blue parallel light beams are incident at different positions of the condensing optical system 112 on a plane perpendicular to an optical axis of the condensing optical system 112. The multiple blue parallel light beams are incident at different positions on an incident surface of the condensing optical system 112. Similarly, the multiple blue light beams are incident at different positions of the condensing optical system 95 on a plane perpendicular to an optical axis of the condensing optical system 95. Here, "condensing optical system" refers to the condensing lens groups 95 and 112. "Collimator lenses" refers to the lens group 107. The blue light beams enter the light intensity equalizing element 113 through the incident end surface 113$i$. The light intensity distribution of the entering blue light beams is equalized. Then, the equalized blue light beam is emitted from the emitting end surface 113$o$. The blue light beam emitted from the emitting end surface 113$o$ is incident on the light valve 121 through the relay lens group 115, folding mirror 120, and condensing lens 122. The light intensity equalizing element 113 receives the multiple concentrated light beams through the incident end surface 113$i$ and converts them into a light beam having a uniform light intensity distribution to emit the light beam. The light valve 121 receives the uniform light beam and converts it into modulated light to emit the modulated light. The light valve 121 converts the incident uniform light beam into modulated light and emits it.

The center wavelength of the light emitted by the blue light source group 100B is longer than that emitted by the excitation light source group 100E by 10 nm or more. This makes it possible to improve the hue of blue compared to a case where the excitation light source group 100E is used as the blue light source. The use of a blue light source having a center wavelength of 460 nm or more improves the hue. The light having a wavelength of 450 nm is purple-blue. The light having a wavelength of 460 nm is closer to blue than the light having a wavelength of 450 nm.

If the excitation light source group 100E is used as the blue light source, a relay optical system is necessary as disclosed in Japanese Patent Application Publication No. 2011-076781 (paragraphs 0055 to 0057, FIG. 3). In contrast, a configuration in which the optical path for the blue light source group 100B is provided separately from the optical path for the excitation light source group 100E requires no such relay optical system and can have a short optical path from the blue light source group 100B to the light intensity equalizing element 113. This makes the projection display device 1 compact.

The configuration and arrangement of the blue light source group 100B will be detailed later. The condensing optical systems 95 and 112 have a function of concentrating the blue lights emitted from the blue light source group 100B on the light intensity equalizing element 113. Thus, as long as this function is provided, the condensing optical system may be disposed only between the color separation filter 111 and the light intensity equalizing element 113. In this case, the condensing optical systems 95 and 96 are removed, and the condensing optical system 112 needs to be designed in view of green, red, and blue wavelength ranges. In a case where the condensing optical systems 95 and 96 are removed, the condensing optical system 112 is preferably composed of two pieces.

The controller 3 may have a function of controlling timing for causing the excitation light source group 100E, blue light source group 100B, and red light source 100R to emit light, in addition to a function of controlling the operation of the light valve 121. The timing is controlled individually for each light source in accordance with the image signal VS. The controller 3 controls the operation of the light valve 121 in synchronization with the light emitting timing of each of the excitation light source group 100E, blue light source group 100B, and red light source 100R.

<First Modification of Configuration of Red Light Source>

Figure 4:
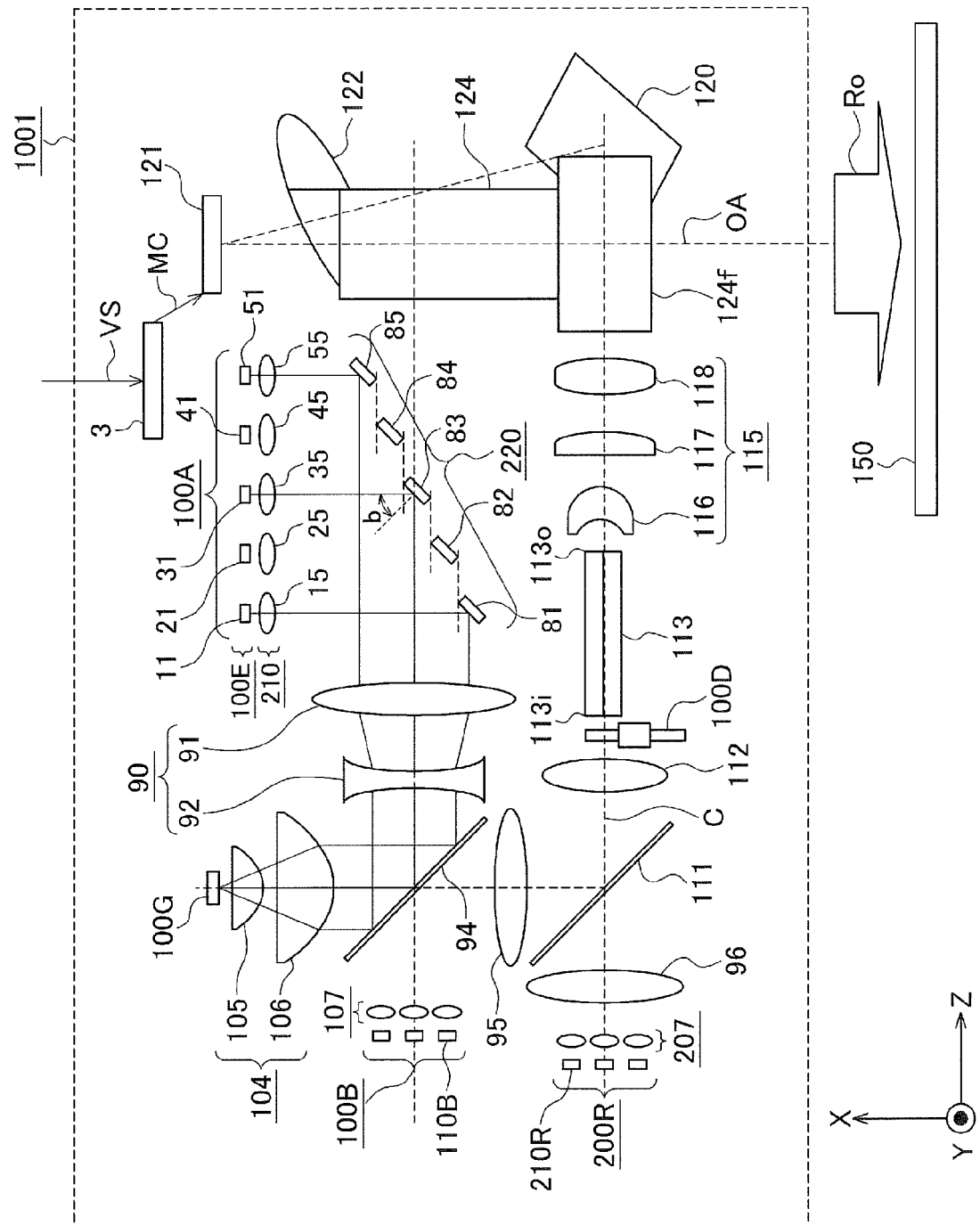
FIG. 4 is a schematic diagram for explaining an arrangement of red laser diodes.

In the first embodiment, the red light source 100R is composed of an LED light source. However, the red light source 100R is not limited to this and may be composed of a laser diode (LD). In this case, a high-intensity red light source can be achieved by arranging multiple laser diodes in a planar manner. "Planar manner" refers to, for example, a matrix manner. For a configuration in which multiple laser diodes are arranged in a planar manner, it is preferable that they are arranged with a concept similar to that for the blue light source group 100B described later with reference to FIG. 9 or 14, for example. FIG. 4 is a diagram of a configuration in which the red light source 100R is composed of red laser diodes 210R. FIG. 4 illustrates a projection display device 1001, which includes a red light source different in structure from that of the projection display device 1 in FIG. 1. While the red light source of the projection display device 1 includes the red light source 100R (LED) and lens group 101, the projection display device 1001 includes a red light source group 200R (laser diodes) and collimator lenses 207. As illustrated in FIG. 4, the multiple red laser diodes may be arranged on a X-Y plane. In this case, an emitting direction of the light source is the +Z axis direction. It is preferable that the optical path length from the red light source group 200R to the light intensity equalizing element 113 is equal to the optical path length from the blue light source group 100B to the light intensity equalizing element 113. This makes it possible to make the position at which a size of light beams from the blue light source group 100B is minimum coincide with the position at which a size of light beams from the red laser diodes 210R is minimum, and place the light diffusion element (the rotary diffusion plate 100D) at the position at which the light beams are minimum. To make the optical path length of the red light sources coincide with the optical path length of the blue light sources 110B, the position of the red light sources 210R moves in the –Z direction.

<Second Modification of Configuration of Red Light Source>

Figure 5:
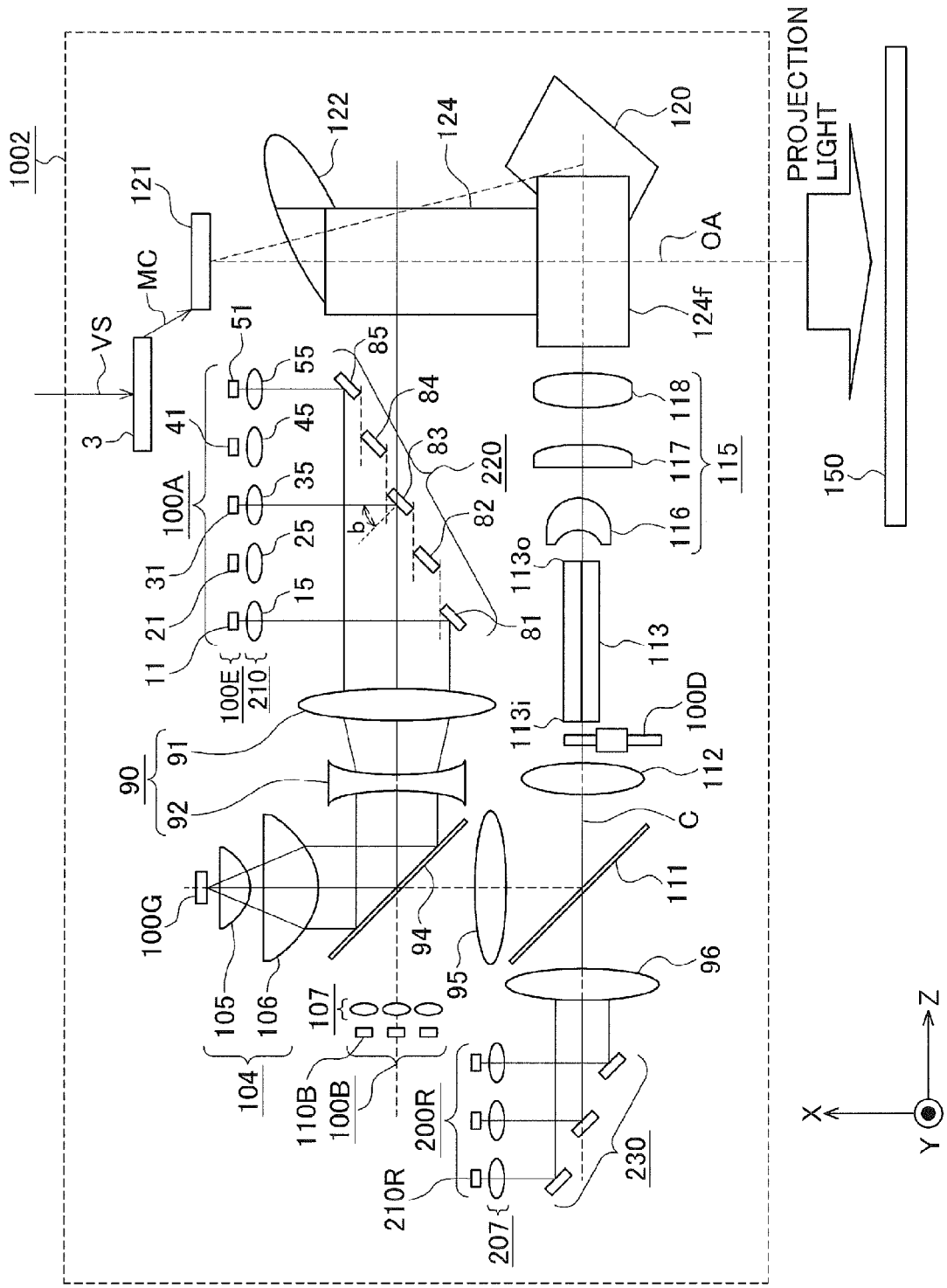
FIG. 5 is a schematic diagram for explaining another arrangement of red laser diodes.

It is also possible to achieve a high-intensity red light source by using a configuration similar to the excitation light source group 100E and light reflecting mirror group 220. The multiple red laser diodes 210R may be disposed in a configuration similar to that for the excitation light source group 100E. "Configuration similar to that for the excitation light source group 100E" refers to a configuration including light sources, collimator lenses, and light reflecting mirrors. FIG. 5 is a diagram of a configuration in which the red light source 100R is composed of the red laser diodes 210R. FIG. 5 illustrates a projection display device 1002, which includes a red light source different in structure from that of the projection display device 1 in FIG. 1. While the red light source of the projection display device 1 includes the red light source 100R (LED) and lens group 101, the projection display device 1002 includes a red light source group 200R (the laser diodes 210R), collimator lenses 207, and a light reflecting mirror group 230. As illustrated in FIG. 5, the multiple red laser diodes 210R are arranged on a Y-Z plane in a planar manner. In FIG. 5, emitting directions of the light sources are the –X axis direction, but it is possible to rotate the light sources about an optical axis C by 180 degrees and arrange the light sources to emit light in the +X axis direction. By arranging light sources on a Y-Z plane like the red light source group 200R illustrated in FIG. 5, it is possible to arrange many light sources and enhance red brightness.

On the other hand, the blue light source group 100B may be composed of a single LED. In this case, a lens group that collimates a light beam emitted from the blue light source group 100B may be disposed after the blue light source group 100B similarly to the lens group 101 illustrated in FIG. 1.

<Positional Relationship of Condensing Lens, Light Valve, and Projection Optical System>

FIG. 3 is a schematic diagram generally illustrating a part of the configuration of the projection display device 1 as viewed from the front side. "Viewed from the front side" refers to being viewed from the –X axis direction side in the +X axis direction. In FIG. 3, for convenience of explanation, the excitation light source group 100E, collimator lens group 210, light reflecting mirror group 220, and lens group 90 are indicated by dashed lines. In FIG. 3, the excitation light source group 100E is indicated by the excitation light sources 11, 12, 13, 21, 22, 23, 31, 32, 33, 41, 42, 43, 51, 52, and 53. The collimator lens group 210 is indicated by the collimator lenses 15, 16, 17, 25, 26, 27, 35, 36, 37, 45, 46, 47, 55, 56, and 57.

A light beam reflected by the folding mirror 120 passes through the condensing lens 122 and is then incident on the light valve 121. As described above, the light valve 121 spatially modulates the incident light in accordance with the modulation control signal MC and outputs modulated light. The projection optical system 124 magnifies and projects the modulated light incident from the light modulating surface (light emitting surface) of the light valve 121 onto the projection surface 150. The modulated light is projected on the projection surface 150, so that an optical image is displayed. The projection surface 150 is, for example, an external screen.

As illustrated in FIG. 3, an optical axis OA of the projection optical system 124 is displaced from a center axis CA of the light emitting surface (light modulating surface) of the light valve 121 in the +Y axis direction by a distance d. The distance d is the distance from the optical axis OA of the projection optical system 124 to the center axis CA of the light emitting surface (light modulating surface) of the light valve 121 in the normal direction of a Z-X plane. "+Y axis direction" refers to the height direction of the projection display device 1. Since the light valve 121 is located on the +X axis direction side of the projection optical system 124, a part of the light valve 121 is indicated by a dashed line. The condensing lens 122 has a shape having a partial cutout so as not to interference with the projection optical system 124. Here, "interference" refers to contact between parts. In FIG. 3, the condensing lens 122 has the cutout at its upper left side so as to avoid the projection optical system 124, which has a cylindrical shape. The optical axis OA and center axis CA are perpendicular to a Y-Z plane. FIG. 3 indicates the optical axis OA and center axis CA with black dots.

As described above, the condensing lens 122 has a shape having a partial cutout. If the cutout region of the condensing lens 122 is large, of light beams incident on the condensing lens 122, an effective angle of light rays incident on the condensing lens 122 from the +Y axis direction side is smaller than an effective angle of light rays incident on the condensing lens 122 from the −Y axis direction side. Here, "+Y axis direction side" refers to a side on which the condensing lens 122 is cut out. "−Y axis direction side" refers to the side opposite the side on which the condensing lens 122 is cut out with respect to the optical axis of the condensing lens 122.

The light beam passing through the condensing lens 122 has a brightness distribution having a shape generally similar to the emitting end surface 113o of the light intensity equalizing element 113. Specifically, when the emitting end surface 113o of the light intensity equalizing element 113 is rectangular, the brightness distribution on the lens 122 has a rectangular shape. Here, "generally" refers to a state in which the outline of the rectangular brightness distribution is blurred. Since the condensing lens 122 is not in conjugate relation with the emitting end surface 113o, the light beam does not form a sharp rectangle at a position of the condensing lens 122. Here, "rectangular shape" refers to a rectangle having a blurred outline.

Figure 6:
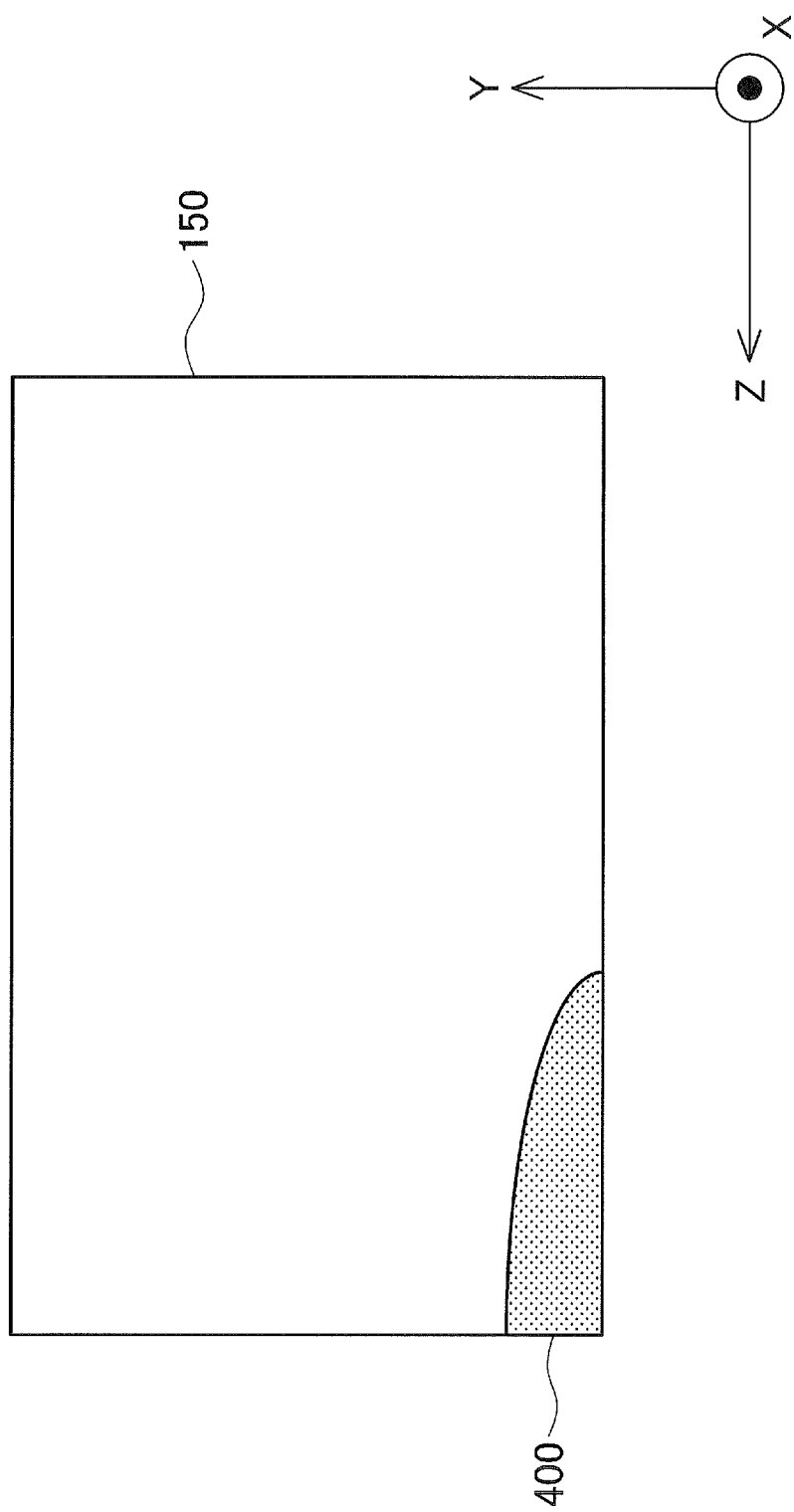
FIG. 6 is a schematic diagram for explaining a shadow 400 appearing on a projection surface 150.

Thus, the effective angle of light beams incident on the condensing lens 122 from the +Y axis direction (short side direction of the light valve 121) is smaller than an effective angle of light beams incident on the condensing lens 122 from the X axis direction (long side direction of the light valve 121). When it is assumed that a light beam incident on the condensing lens 122 from the X axis direction and a light beam incident on the condensing lens 122 from the Y axis direction have the same incident angle, a light beam incident on the cutout portion of the condensing lens 122 at a large angle from the +Y axis direction (short side direction of the light valve 121) passes through the cutout portion of the condensing lens 122. Thus, the light is not concentrated on the light valve 121, which generates an area of shadow 400 at the lower left of the projection surface 150 as illustrated in FIG. 6. Here, "from the X axis direction" refers to "from both the plus and minus directions" of the X axis; "from the Y axis direction" refers to "from both the plus and minus directions" of the Y axis.

This phenomenon occurs due to the partial cutout of the condensing lens 122. For example, when the external form of a lens barrel holding a lens of the projection optical system 124 is large, the cutout amount of the condensing lens 122 needs to be large. When the cutout amount is large, the shadow 400 on the projection surface 150 in FIG. 6 tends to occur.

Figure 7:
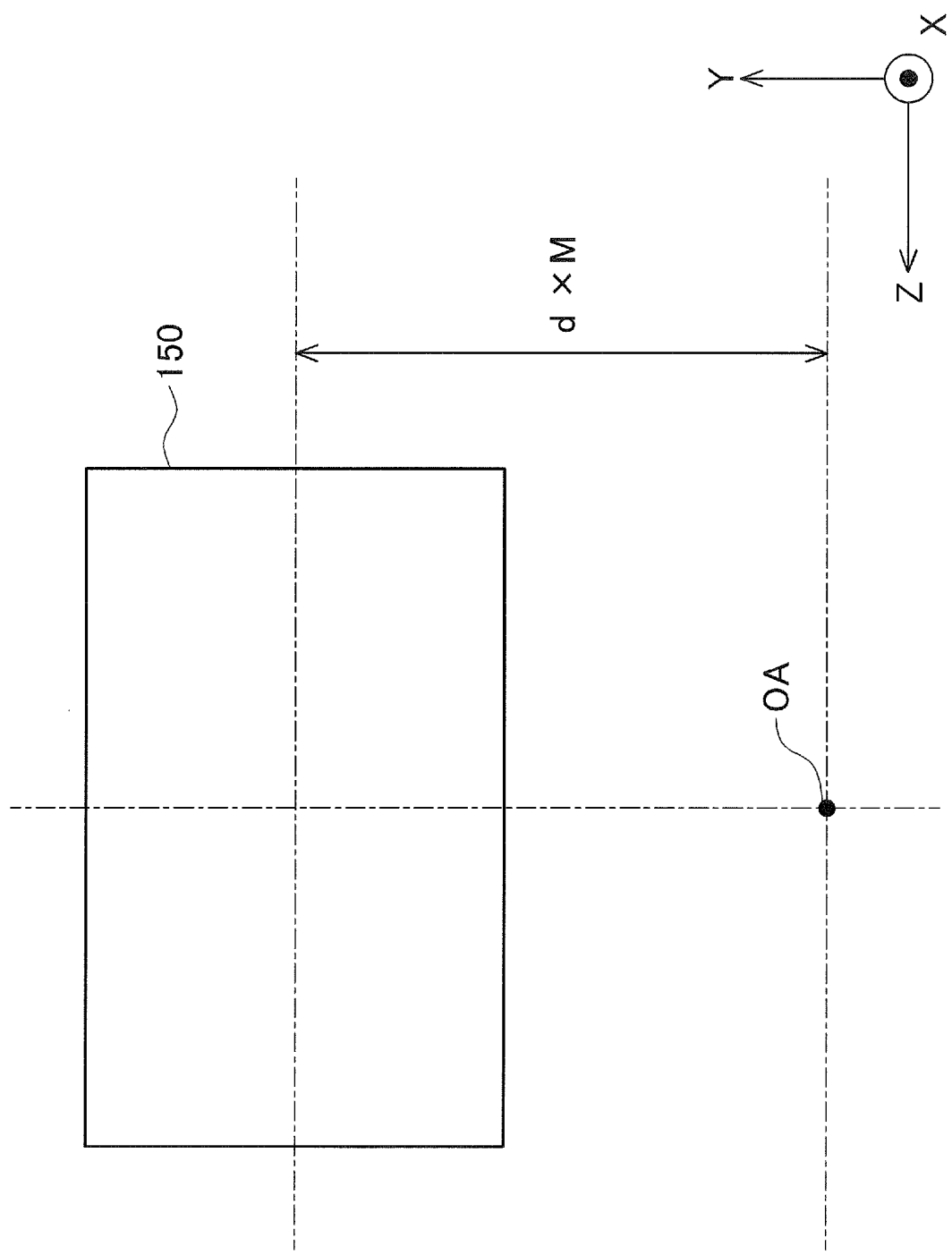
FIG. 7 is a schematic diagram for explaining a relationship between a projection optical system 124 and the projection surface 150 in the first embodiment.

The cutout amount of the condensing lens 122 can be reduced by increasing the distance d. However, if the distance d is increased, the position at which an image is projected on the projection surface 150 moves from the optical axis OA of the projection optical system 124 in the Y axis direction by a distance obtained by multiplying a magnification ratio M of the projection optical system 124 by the distance d. This causes a problem that an image cannot be displayed at a position suitable for market demands (see FIG. 7). FIG. 7 is a schematic diagram for explaining the relationship between the projection optical system 124 and the projection surface 150. As illustrated in FIG. 7, a center position of the projection surface 150 is displaced from the optical axis OA of the projection optical system 124 in the Y axis direction by a distance of d x M. As described above, d denotes the distance from the center axis CA of the light valve 121 to the optical axis OA of the projection optical system 124 in the Y axis direction. M denotes the magnification ratio of the projection optical system 124. In the case of the light guiding optical system from the relay lens group 115 to the light valve 121 in the first embodiment, the center axis CA of the light valve 121 and the optical axis OA of the projection lens do not coincide with each other. The optical axis OA is perpendicular to a Y-Z plane. FIG. 7 indicates the optical axis OA with a black dot. The "projection surface 150" in FIG. 7 indicates a position where an image is projected on the projection surface 150 such as a screen.

Figure 8A:
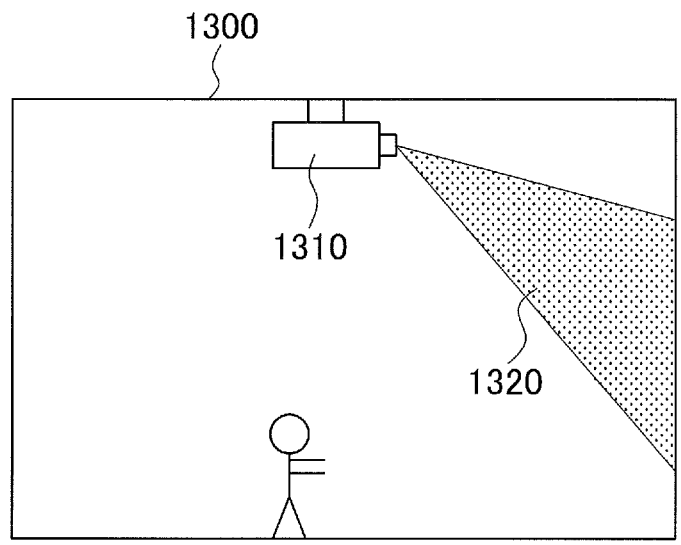
FIGS. 8(A) and 8(B) are schematic diagrams for explaining a problem in use of projection display devices.
Figure 8B:
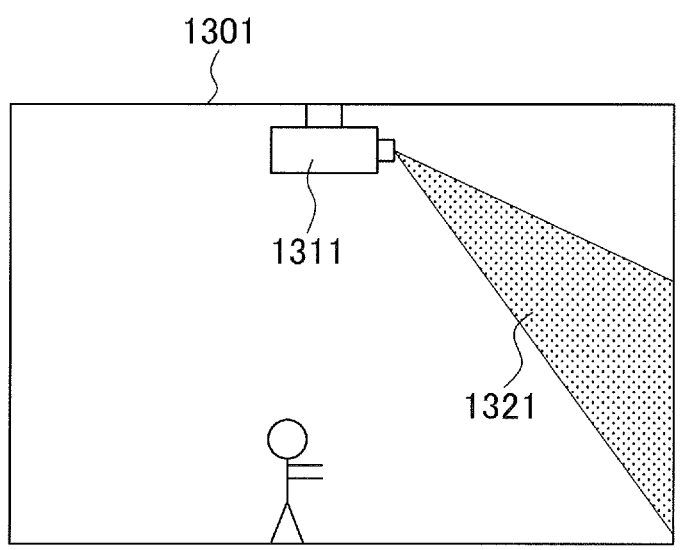

FIGS. 8(A) and 8(B) are room layouts for explaining the above. In FIG. 8(A), a projection display device 1310 is fixedly disposed on a ceiling of a room 1300. The projection display device 1310 projects image light 1320 toward a wall. In FIG. 8(B), a projection display device 1311 is fixedly disposed on a ceiling of a room 1301. The projection display device 1311 projects image light 1321 toward a wall. In FIG. 8(A), the image light 1320 is projected onto the center of the wall. In FIG. 8(B), the image light 1321 is projected onto the lower side of the wall. If the distance d is increased, the position where an image is projected on the projection surface 150 moves in the Y axis direction and the image is projected at a position as illustrated in FIG. 8(B). This causes a problem that the image cannot be displayed at a proper position as illustrated in FIG. 8(A). The vertical direction in FIGS. 8(A) and 8(B) correspond to the Y axis direction in FIG. 7.

In the projection display device 1 having the condensing lens 122 with the partial cutout as illustrated in FIG. 3, the following two methods are conceivable. The first method is a method of intercepting, before the condensing lens 122, light rays incident on the light valve 121 from the +Y axis direction of the cutout portion. "Light rays incident from the +Y axis direction of the cutout portion" refers to light in the short side direction. Here, "before" refers to "before light is incident on the condensing lens 122". The second method is a method of reducing a divergence angle of a light beam emitted from the light intensity equalizing element 113 so as not to generate the area of the shadow 400 illustrated in FIG. 6.

However, the first method has a low light use efficiency due to light loss resulting from the light interception. In the second method, the divergence angle of the light beam emitted from the light intensity equalizing element 113 is reduced equally between the long side direction and the short side direction. Since the effective angle in the long side direction is made equal to the effective angle in the short side direction, a part of the light beam of the effective angle in the long side direction is not used. Thus, the above method has a low light use efficiency. Instead of using the above methods, the first embodiment makes an angle of a light beam incident on the condensing lens 122 from the short side direction smaller than an angle of a light beam incident from the long side direction.

<Arrangement of Laser Light Sources and Light Beam Positions of Laser Light Incident on Light Intensity Equalizing Element>

Figure 9:
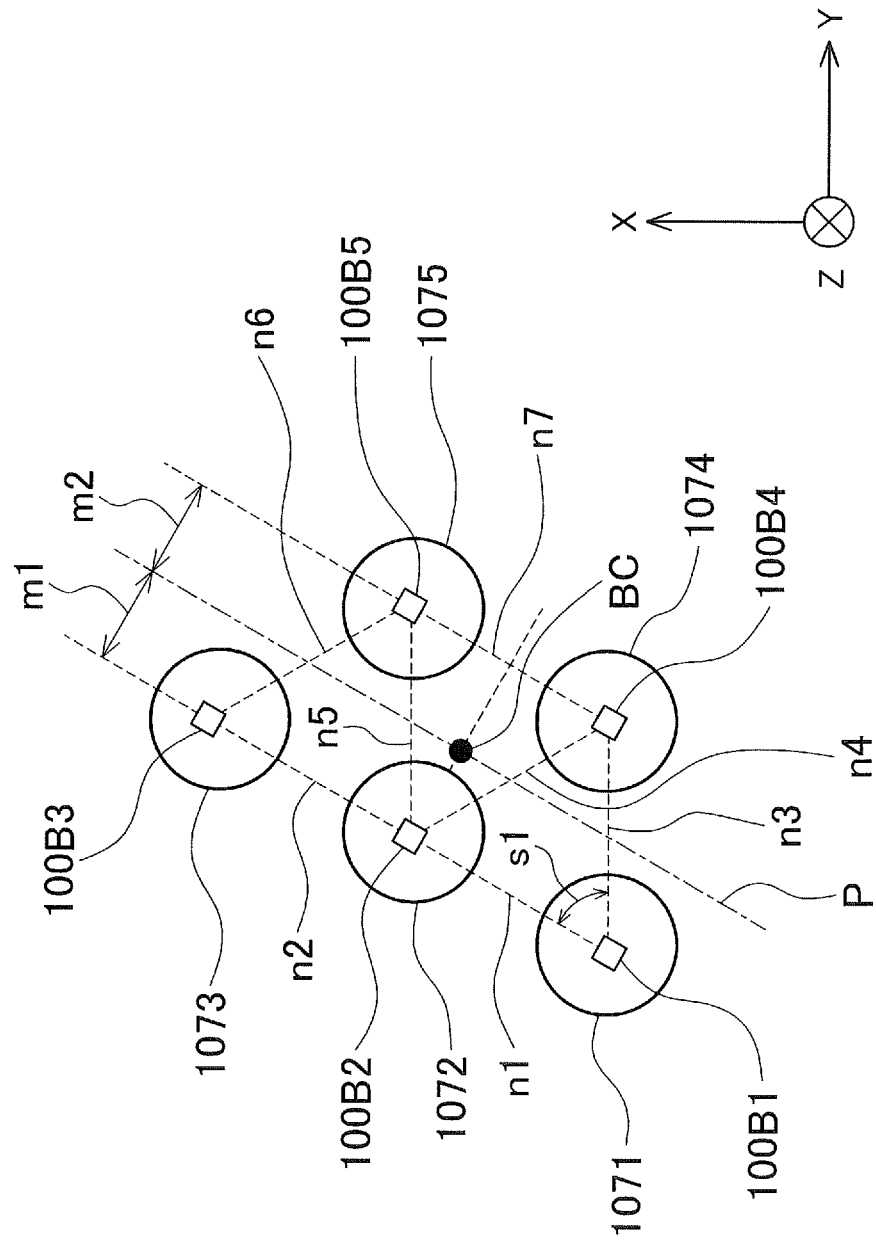
FIG. 9 is a schematic diagram illustrating an arrangement of a blue light source group 100B in the first embodiment.

FIG. 9 is a schematic diagram illustrating the arrangement of the blue light source group 100B. FIG. 10 is a schematic diagram of the light intensity equalizing element 113 as viewed from the incident end surface 113i side, i.e., a diagram of the incident end surface 113i of the light intensity equalizing element 113 as viewed from the −Z axis direction. As illustrated in FIGS. 9 and 10, the blue light source group 100B and light intensity equalizing element 113 are arranged to be inclined with respect to the X and Y axes. The light valve 121 is used in such a manner that a light beam is incident on the light valve 121 from obliquely below. Thus, the light intensity equalizing element 113 is rotated about the optical axis C so that the long side direction of the light intensity equalizing element 113 optically coincides with the long side direction of the light valve 121. The rotation of the light beam about the optical axis center is compensated by the folding mirror 120. The optical axis C is perpendicular to an X-Y plane. FIG. 10 indicates the optical axis C with a black dot.

The blue light source group 100B includes five light sources 100B1, 100B2, 100B3, 100B4, and 100B5. These light sources 100B1, 100B2, 100B3, 100B4, and 100B5 correspond to the blue light sources 110B in FIGS. 1, 4, and 5. It is assumed that the distance between the light sources 100B1 and 100B2 is n1; the distance between the light sources 100B2 and 100B3 is n2; the distance between the light sources 100B1 and 100B4 is n3; the distance between the light sources 100B2 and 100B4 is n4; the distance between the light sources 100B2 and 100B5 is n5; the distance between the light sources 100B3 and 100B5 is n6; the distance between the light sources 100B4 and 100B5 is n7. When the distances n1, n2, n3, n4, n5, n6, and n7 are defined as above, the following relationship is satisfied:

$n1=n2=n3=n4=n5=n6=n7$.

The light sources 100B1, 100B2, and 100B4 are arranged on an X-Y plane in an equilateral triangular arrangement. The light sources 100B2, 100B4, and 100B5 are arranged on the X-Y plane in an equilateral triangular arrangement. The light sources 100B2, 100B3, and 100B5 are arranged on the X-Y plane in an equilateral triangular arrangement. The multiple light sources 100B1, 100B2, 100B3, 100B4, and 100B5 are arranged in an equilateral triangular arrangement. Thus, an angle s1 is 60 degrees. The multiple light sources 100B1, 100B2, 100B3, 100B4, and 100B5 are in an equilateral triangular arrangement. The light sources 100B1, 100B2, and 100B3 are arranged on a straight line. The light sources 100B4 and 100B5 are arranged on a straight line parallel to the straight line on which the light sources 100B1, 100B2, and 100B3 are arranged.

An axis P in FIG. 9 is parallel to an axis Q in FIG. 10. The axis P is a straight line parallel to the straight line on the X-Y plane connecting centers of the light sources 100B1, 100B2, and 100B3. The axis P is located between the light sources 100B1, 100B2, and 100B3 and the light sources 100B4 and 100B5. The distances from the light sources 100B1, 100B2, and 100B3 to the axis P are m1. The distances from the light sources 100B4 and 100B5 to the axis P are m2. The distances m1 and m2 satisfy a relationship of m1=m2. An center axis BC corresponds to the optical axis C. The center axis BC coincides with the optical axis C on an optical path. The center axis BC is perpendicular to the X-Y plane. FIG. 9 indicates the center axis BC with a black dot. The center axis BC passes through the intersection point of the axis P and the perpendicular line dropped from the center of the light source 100B2 to the axis P on the X-Y plane. The axis Q is a straight line passing through centers of the two short sides of the light intensity equalizing element 113. The axis Q perpendicularly intersects the optical axis C.

The light sources 100B1, 100B2, 100B3, 100B4, and 100B5 are blue lasers. In order for a laser to efficiently output light, cooling of the laser is very important. Thus, it is necessary to set the intervals between the respective light sources 100B1, 100B2, 100B3, 100B4, and 100B5 to desired intervals. "Desired intervals" refers to intervals that enable the lasers to be cooled. The distances n1, n2, n3, n4, n5, n6, and n7 between the light sources 100B1, 100B2, 100B3, 100B4, and 100B5 are determined from requirements for cooling the lasers, which are light sources. Cooling the lasers includes, for example, mounting a heat sink member to each light source. A certain distance is required to mount a heat dissipation fin or the like to a laser. To prevent heat conduction between adjacent light sources, the light sources need to be separated from each other by a certain distance. In view of cooling efficiency and light use efficiency, the distances n1, n2, n3, n4, n5, n6, and n7 between the light sources 100B1, 100B2, 100B3, 100B4, and 100B5 are preferably equal to each other.

To reduce an incident angle in the Y axis direction of a light beam incident on the light valve 121, it is necessary to make the distance (m1+m2) described above as small as possible. This is because when parallel light beams emitted from the blue light source group 100B are incident on the light intensity equalizing element 113, if the distances m1 and m2 are large, an incident angle from the short side direction of the light intensity equalizing element 113 is large. Lights emitted from the blue light source group 100B are collimated by the collimator lenses 107. The Y axis direction of the light valve 121 corresponds to the short side direction of the light intensity equalizing element 113.

Figure 11:
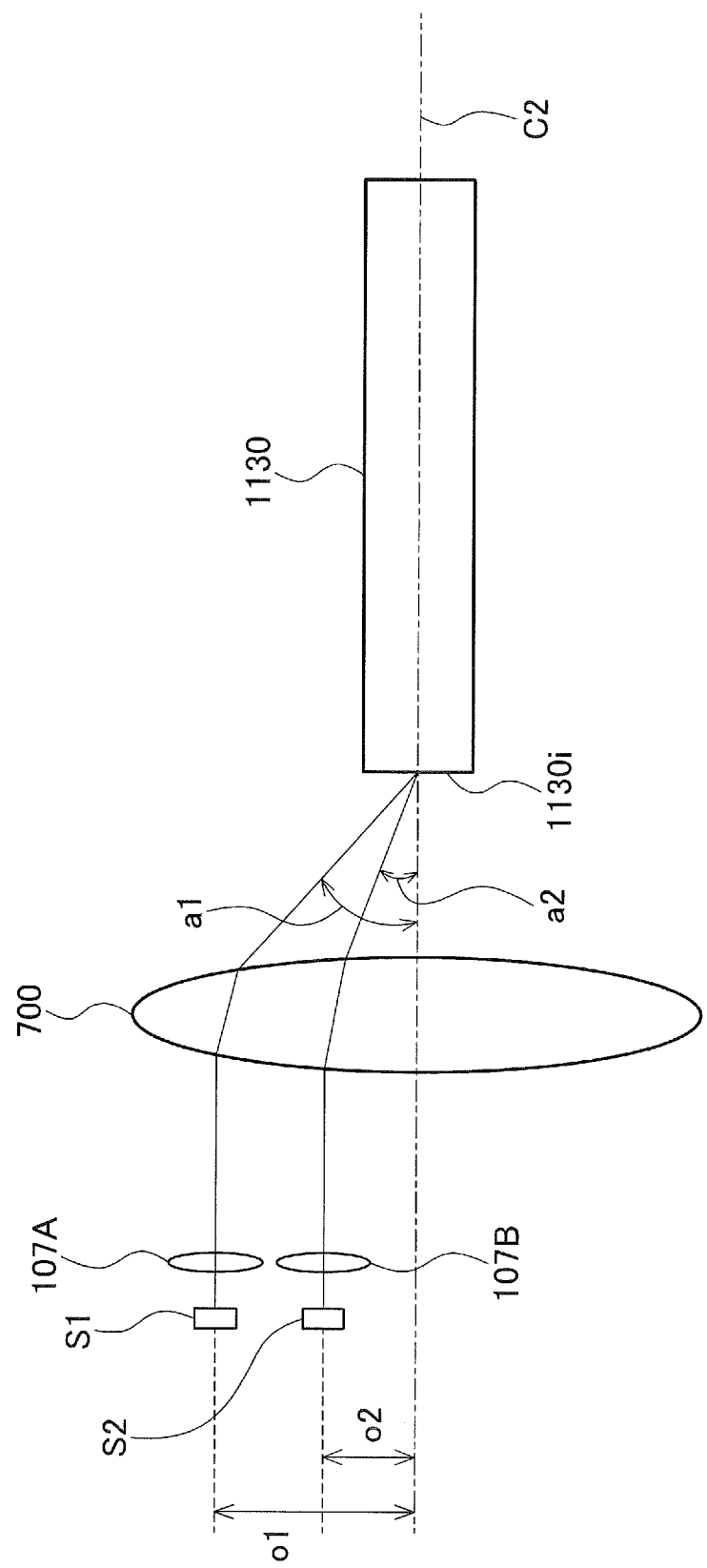
FIG. 11 is a schematic diagram for explaining light rays incident on the light intensity equalizing element 113 in the first embodiment.

FIG. 11 is a schematic diagram for explaining light rays incident on the light intensity equalizing element 113. A light beam emitted from a light source S1 is converted into a parallel light beam by a collimator lens 107A. The light source S1 emits light in a direction parallel to an optical axis C2. The parallel light beam emitted from the collimator lens 107A is parallel to the optical axis C2. The parallel light beam is concentrated on an incident end surface 1130$i$ of a light intensity equalizing element 1130 by a condensing lens 700. A light beam emitted from a light source S2 is converted into a parallel light beam by a collimator lens 107B. The light source S2 emits light in a direction parallel to the optical axis C2. The parallel light beam emitted from the collimator lens 107B is parallel to the optical axis C2. The parallel light beam is concentrated on the incident end surface 1130$i$ of the light intensity equalizing element 1130 by the condensing lens 700. Here, it is assumed that the light intensity equalizing element 1130 is not rotated about the optical axis C2 and the light beams are incident from a short side direction of the light intensity equalizing element 1130. "The light beams are incident from a short side direction" refers to a situation in which the light beams are incident from a plus direction or a minus direction of a straight line parallel to the short sides when an original point (zero) is defined on the optical axis C2. The sides of the incident end surface 1130$i$ on the front and rear sides in FIG. 11 are the short sides. That is, the vertical direction in FIG. 11 is the short side direction. The sides of the incident end surface 1130$i$ on the upper and lower sides in FIG. 11 are the long sides. That is, the long sides are sides extending in the depth direction in FIG. 11.

It is assumed that the distance from the optical axis C2 to the light source S1 in the short side direction is o1; the distance from the optical axis C2 to the light source S2 in the short side direction is o2. In this case, the distances o1 and o2 satisfy a relationship of "o1>o2". That is, the distance o1 is greater than the distance o2. Incident angles a1 and a2 satisfy a relationship of "a1>a2". That is, the incident angle a1 is greater than the incident angle a2. The incident angle a1 is an incident angle at which the light emitted from the light source S1 is incident on the incident end surface of the light intensity equalizing element 1130. The incident angle a2 is an incident angle at which the light emitted from the light source S2 is incident on the incident end surface of the light intensity equalizing element 1130.

The axis P in FIG. 9 is parallel to the axis Q in FIG. 10. FIG. 10 is a schematic view of the incident surface of the light intensity equalizing element 113 as viewed from the −Z axis direction. From the above description of FIGS. 9 and 10, the above distances m1 and m2, which correspond to a distance in the short side direction of the light intensity equalizing element 113, are preferably as small as possible. This is because, when the distances m1 and m2 are small, an incident angle of light on the light intensity equalizing element 113 is small. Reduction of the distances m1 and m2 in FIG. 9 corresponds to, for example, change from the distance of to the distance o2 in FIG. 11. This reduces the incident angle from a1 to a2.

As illustrated in FIGS. 9 and 10, the distance in the short side direction from the optical axis C of the light intensity equalizing element 113 corresponds to the distances m1 and m2. The distance in the long side direction from the optical axis C of the light intensity equalizing element 113 corresponds to the distances n1 and n2. Here, the relationship of the distances m1, m2, and n1 in FIG. 9 is represented by the following formula (1):

$$m1=m2=n1\times(3^{0.5})/4 \quad (1).$$

Thus, a relationship of the following formula (2) is satisfied:

$$m1=m2<n1=n2 \quad (2).$$

Since the distance corresponding to the short side direction of the light intensity equalizing element 113 is smaller than the distance corresponding to the long side direction of the light intensity equalizing element 113, the incident angle of light incident on the light intensity equalizing element 113 from the short side direction is smaller than the incident angle of light incident on the light intensity equalizing element 113 from the long side direction.

Thus, by disposing the light sources 100B1, 100B2, 100B3, 100B4, and 100B5 of the blue light source group 100B in an equilateral triangular arrangement as in the first embodiment, it becomes possible to make the incident angle in the short side direction of the light intensity equalizing element 113 smaller than the incident angle in the long side direction. This eliminates the need for intercepting light before it reaches the light valve 121. This provides high light use efficiency.

Lights emitted from the blue light source group 100B are collimated into parallel light beams by collimator lenses 1071, 1072, 1073, 1074, and 1075. The collimator lenses 1071, 1072, 1073, 1074, and 1075 are arranged to be eccentric to the corresponding light sources 100B1, 100B2, 100B3, 100B4, and 100B5 toward the center axis BC in the range of 0.1 mm to 0.5 mm so as to reduce the incident angle in the short side direction of the light intensity equalizing element 113. That is, optical axes of the collimator lenses 1071, 1072, 1073, 1074, and 1075 are displaced from optical axes of the corresponding light sources 100B1, 100B2, 100B3, 100B4, and 100B5 by 0.1 mm to 0.5 mm. The collimator lenses 1071, 1072, 1073, 1074, and 1075 are eccentric to the optical axes of the corresponding light sources 100B1, 100B2, 100B3, 100B4, and 100B5 in directions toward a center of the light source group. Here, "light source group" refers to the blue light source group 100B. "Directions toward a center" refers to directions toward the center axis BC.

FIGS. 12(A) and 12(B) are schematic diagrams illustrating incident positions of light beams incident on the incident end surface 113i of the light intensity equalizing element 113. If the optical axes of the collimator lenses 1071, 1072, 1073, 1074, and 1075 coincide with the optical axes of the corresponding light sources 100B1, 100B2, 100B3, 100B4, and 100B5, light beams emitted from the blue light source group 100B are concentrated at a center of the incident surface 113i as illustrated in FIG. 12(B). Five light beams emitted from the five light sources 100B1, 100B2, 100B3, 100B4, and 100B5 become a single light beam B0 on the incident surface 113i. The five light beams are concentrated on the optical axis C. "Light beams are concentrated" refers to concentration of the multiple light beams at a particular point. In contrast, "reach" does not require light beams to concentrate at one point.

If the optical axes of the collimator lenses 1071, 1072, 1073, 1074, and 1075 are eccentric to the optical axes of the corresponding light sources 100B1, 100B2, 100B3, 100B4, and 100B5 toward the center axis BC, the respective light beams reach the incident end surface 113i as illustrated in FIG. 12(A). The light beam emitted from the light source 100B1 reaches the position of the light beam B1. The light beam emitted from the light source 100B2 reaches the position of the light beam B2. The light beam emitted from the light source 100B3 reaches the position of the light beam B3. The light beam emitted from the light source 100B4 reaches the position of the light beam B4. The light beam emitted from the light source 100B5 reaches the position of the light beam B5. The incident positions of the multiple parallel light beams B1, B2, B3, B4, and B5 on the light intensity equalizing element 113 are separately arranged on the incident end surface 113i. Thus, an incident angle a in the short side direction of a light beam incident on the light intensity equalizing element 113 is small as compared to a case where the optical axes of the blue light source group 100B coincide with the optical axes of the corresponding collimator lenses 107. Thus, the shadow 400 illustrated in FIG. 6 can be reduced. Further, the projection display device 1 with high light use efficiency can be achieved. "Separately" refers to a situation in which there are gaps between the respective light beams. FIG. 12 illustrates an example in which the respective light beams B1, B2, B3, B4, and B5 are separated from each other on the incident end surface 113i of the light intensity equalizing element 113. However, the respective light beams B1, B2, B3, B4, and B5 may be incident at different positions on the incident end surface 113i while adjacent light beams abut each other.

The incident positions of the multiple parallel light beams B1, B2, B3, B4, and B5 on the light intensity equalizing element 113 may be in an equilateral triangular arrangement on the incident end surface 113i. Thereby, the light beams B1, B2, B3, B4, and B5 incident on the light intensity equalizing element 113 can be spaced from each other at equal intervals. The positions of the light beams B1, B2, B3, B4, and B5 on the incident end surface 113i are dispersed at equal intervals. Thus, compared to a case where the light beams B1, B2, B3, B4, and B5 are concentrated at the center of the incident surface 113i as illustrated in FIG. 12(B), local temperature rise can be prevented in the vicinity of the incident end surface 113i.

FIGS. 13(A) and 13(B) are schematic diagrams illustrating the incident positions of light beams incident on the incident end surface 1131i of the light intensity equalizing element 1131. In the projection display device 1 illustrated in FIG. 1, the optical path length from the blue light source group 100B to the light intensity equalizing element 113 is longer than that from the red light source 100R, for example.

As illustrated in FIG. 13(A), a light beam emitted from a light source S3 is converted into a parallel light beam by a collimator lens 107C. The light source S3 emits the light in a direction parallel to an optical axis C3. The parallel light beam emitted from the collimator lens 107C is also parallel to the optical axis C3. The parallel light beam emitted from the collimator lens 107C reaches the incident end surface 1131*i* of the light intensity equalizing element 1131 through the condensing lens 701. The parallel light beam emitted from the collimator lens 107C reaches a position on the optical axis C3. The incident angle of the parallel light beam reaching the incident end surface 1131*i* is a3.

As illustrated in FIG. 13(B), a light beam emitted from a light source S4 is converted into a parallel light beam by a collimator lens 107D. The light source S4 emits the light in a direction parallel to the optical axis C3. However, since the collimator lens 107D is eccentric toward the optical axis C3, the parallel light beam emitted from the collimator lens 107D is not parallel to the optical axis C3. The parallel light beam is incident on the condensing lens 701 while approaching the optical axis C3. The distance from the position at which the parallel light beam is incident on the condensing lens 701 to the optical axis C3 is smaller than the distance o3 from the optical axis C3 to the light source S4. The distance o3 from the optical axis C3 to the light source S4 is set to be equal to the distance o3 from the optical axis C3 to the light source S3. The parallel light beam emitted from the collimator lens 107D reaches the incident end surface 1131*i* of the light intensity equalizing element 1131 through the condensing lens 701. The parallel light beam emitted from the collimator lens 107D reaches a position displaced from the optical axis C3. The incident angle of the parallel light beam reaching the incident end surface 1131*i* is a4. The parallel light beam emitted from the collimator lens 107D reaches the incident end surface 1131*i* of the light intensity equalizing element 1131 without using the concentrating effect of the condensing lens 701. As can be seen from FIG. 13(B), emitting positions of multiple light beams emitted from the condensing lens (condensing optical system) 701 on the emitting surface of the condensing lens 701 and the incident positions of the multiple light beams emitted from the condensing lens 701 on the incident end surface 1131*i* of the light intensity equalizing element 1131 are opposite each other with respect to the optical axis C3 of the light intensity equalizing element 1131. That is, the emitting positions of multiple concentrated light beams on the emitting surface of the condensing lens (condensing optical system) 701 and the incident positions of the multiple concentrated light beams on the incident end surface 1131*i* of the light intensity equalizing element 1131 are located opposite each other with respect to the optical axis C3 of the light intensity equalizing element 1131. As can be seen from FIGS. 13(A) and 13(B), the incident angle a4 is smaller than the incident angle a3. "Concentrating effect" refers to an effect in which, as illustrated in FIG. 11, when multiple parallel light beams are incident on the condensing lens 700, the multiple parallel light beams are concentrated at one point (in FIG. 11, the optical axis C2) on the incident end surface 1130*i* of the light intensity equalizing element 1130. In FIG. 11, the multiple light beams are concentrated on the incident end surface 1130*i* of the light intensity equalizing element 1130 by the condensing lens 700.

In this way, by causing the respective light beams emitted from the blue light source group 100B to reach different positions on the incident end surface 113*i*, it becomes possible to improve light use efficiency. A center of all of the five collimator lenses 1071, 1072, 1073, 1074, and 1075 need not be on the center axis BC. As long as each of the collimator lenses 1071, 1072, 1073, 1074, and 1075 is eccentric toward the center axis BC, the same advantage is obtained even if the eccentric amounts or the like are set appropriately.

The eccentric directions may also be determined depending on conditions. For example, when the incident angle in the long side direction of the light intensity equalizing element 113 is not controlled, the collimator lenses 107 may be made eccentric so as to reduce the incident angle only in the short side direction. Thus, the collimator lenses 1071, 1072, 1073, 1074, and 1075 may be made eccentric in a direction perpendicular to the axis P on the X-Y plane.

The red light source 100R and phosphor element 100G in the first embodiment are arranged on the optical axis C. Thus, the light beam emitted from the red light source 100R is concentrated on the optical axis C on the incident end surface 113*i* of the light intensity equalizing element 113 by the condensing optical systems 96 and 112. The light beam emitted from the phosphor element 100G is concentrated on the optical axis C on the incident end surface 113*i* of the light intensity equalizing element 113 by the condensing optical systems 95 and 112. However, in the light source arrangement illustrated in FIG. 9, each light source in the blue light source group 100B is not arranged on the optical axis C. "Light source arrangement illustrated in FIG. 9" refers to a configuration in which the multiple light sources 100B1, 100B2, 100B3, 100B4, and 100B5 are disposed at positions of equilateral triangles and the optical axes of the collimator lenses 1071, 1072, 1073, 1074, and 1075 are eccentric to the optical axes of the light sources 100B1, 100B2, 100B3, 100B4, and 100B5. Thus, as illustrated in FIG. 13(B), a light beam emitted from each light source of the blue light source group 100B reaches a position off the optical axis C on the incident end surface 113*i* of the light intensity equalizing element 113. The light concentration position of a light source arranged off the optical axis C can be set to be different from those of the red light source 100R and phosphor element 100G. The optical axis C corresponds to the center axis BC in FIG. 9. As illustrated in FIG. 13(B), the light of the blue light source group 100B is concentrated in front of the incident end surface 1130*i*. Here, "in front of" refers to "before the light is incident on the incident end surface 1130*i*".

In this way, by displacing the light concentration position, the light beams reaching the incident end surface 113*i* of the light intensity equalizing element 113 can be separated from each other. This makes it possible to reduce temperature rise of the incident end surface 113*i*. In the case of a light source arrangement in FIG. 14(B) described later, while a light beam emitted from a light source 101B3 reaches the light intensity equalizing element 113 on the optical axis C, light beams from the other light sources 101B1, 101B2, 101B4, and 101B5 do not reach the light intensity equalizing element 113 on the optical axis C. Thus, it is possible to separately arrange the respective light beams on the incident end surface 113*i* of the light intensity equalizing element 113, obtaining the same advantage.

The light beams emitted from the respective light sources of the blue light source group 100B reach the light intensity equalizing element 113 by the condensing optical systems 95 and 112. The blue light source group 100B does not require a condensing optical system for each light source. Thus, the optical system of the blue light source group 100B does not complicate the device. The multiple optical paths can be guided to the light intensity equalizing element 113 by one condensing optical system.

Figure 14B:
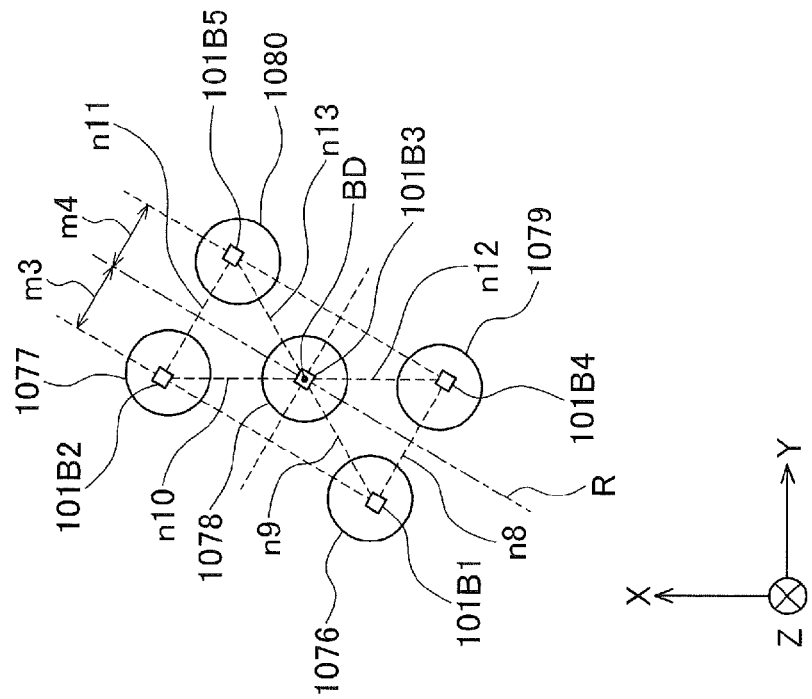
FIGS. 14(A) and 14(B) are schematic diagrams illustrating arrangements of the blue light source group 100B in the first embodiment.
Figure 14A:
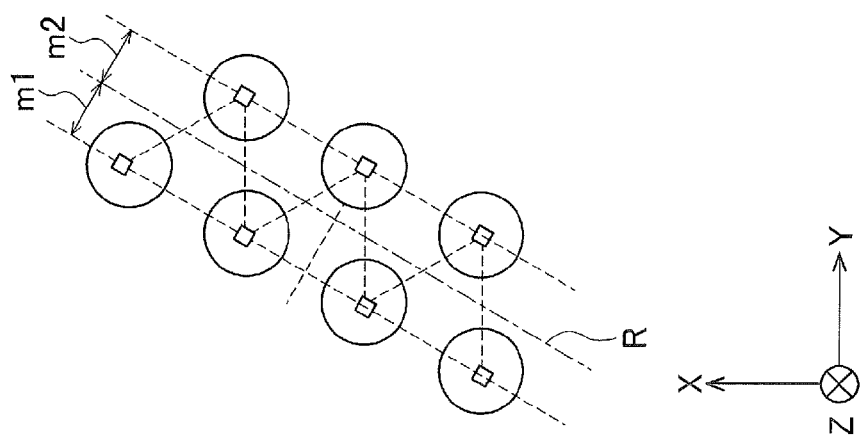

The first embodiment illustrates, in FIG. 9, a case where the five light sources are used. However, the configuration of FIG. 9 is not mandatory. FIGS. 14(A) and 14(B) are schematic diagrams illustrating arrangements of the blue light source group 100B. For example, as in FIG. 14(A), seven light sources may be disposed in an equilateral triangular arrangement. In FIG. 14(A), the light sources are arranged on two straight lines parallel to an axis R across the axis R. The distance from the axis R to one of the straight lines is m1. On the one straight line, four light sources are arranged at equal intervals. The distance from the axis R to the other of the straight lines is m2. On the other straight line, three light sources are arranged at equal intervals. In FIG. 14(A), since the respective light sources are disposed in an equilateral triangular arrangement, the distance m1 is equal to the distance m2. The intervals between the four light sources on the one straight line is equal to the intervals between the three light sources on the other straight line. Further, five light sources may be arranged as illustrated in FIG. 14(B). In FIG. 14(B), one light source 101B3 is arranged at a center, and the other light sources 101B1, 101B2, 101B4, and 101B5 are arranged at positions of four vertexes. The light sources 101B1, 101B2, 101B4, and 101B5 are positioned at the vertexes of a rectangle. These light sources 101B1, 101B2, 101B3, 101B4, and 101B5 correspond to the blue light sources 110B illustrated in FIGS. 1, 4, and 5. The light sources 101B1 and 101B4, which are located at both ends of a short side, and the light source 101B3, which is located at the center, form an equilateral triangle. Similarly, the light sources 101B2 and 101B5, which are located at both ends of a short side, and the light source 101B3, which is located at the center, form an equilateral triangle. This arrangement of the light sources 101B1, 101B2, 101B3, 101B4, and 101B5 has a light use efficiency higher than that of a square arrangement. The multiple light sources 101B1, 101B2, 101B3, 101B4, and 101B5 are in an equilateral triangular arrangement.

However, the arrangement in FIG. 9 has an angle of a light beam incident from the short side direction of the light intensity equalizing element 113 smaller than that of the arrangement in FIG. 14(B). It is assumed that the distance between the light sources 101B1 and 101B4 is n8; the distance between the light sources 101B1 and 101B3 is n9; the distance between the light sources 101B2 and 101B3 is n10; the distance between the light sources 101B2 and 101B5 is n11; the distance between the light sources 101B3 and 101B4 is n12; the distance between the light sources 101B3 and 101B5 is n13. When the distances n8, n9, n10, n11, n12, and n13 are defined as above, the following relationship is satisfied:

$$n8 = n9 = n10 = n11 = n12 = n13.$$

Further, the distances n8, n9, n10, n11, n12, and n13 are equal to the distance n1 in FIG. 9.

The relationship between the distances m1, m2, and n1 in FIG. 9 is represented by the following formula (3):

$$m1 = m2 = n1 \times (3^{0.5})/4 \quad (3)$$

The relationship between the distances m3, m4, and n1 in FIG. 14(B) is represented by the following formula (4):

$$m3 = m4 = n1 \times \tfrac{1}{2} \quad (4)$$

From the formulae (3) and (4), the distance m1 is smaller than the distance m3 (m1<m3), which shows that the arrangement in FIG. 9 is more advantageous in reducing the incident angle a in the short direction.

However, the arrangement in FIG. 14B has another advantage as compared to the arrangement in FIG. 9. In FIG. 14(B), collimator lenses 1076, 1077, 1079, and 1080 are eccentric toward a center axis BD. The center axis BD is at a center of the five light sources 101B1, 101B2, 101B3, 101B4, and 101B5 arranged on an X-Y plane. The center axis BD is perpendicular to the X-Y plane. FIG. 14(B) indicates the center axis BD with a black dot. Since the light source 101B3 is disposed on the center axis BD, the collimator lens 1078 need not be eccentric. As such, the number of eccentric collimator lenses can be reduced by one. This makes it possible to improve the workability and assemblability of parts. The center axis BD is located at a center of the light source 101B3 and perpendicular to the X-Y plane. The light source B3 is located at a center of the four light sources 101B1, 101B2, 101B4, and 101B5.

For example, Japanese Patent Application Publication No. 2011-076781 (paragraphs 0055 to 0057, FIG. 3) discloses a light source device in which an optical path of light from an excitation light source and an optical path of blue light are common from the light source to a phosphor element. This light source device guides light from a blue light source to a light intensity equalizing element by using a relay optical system. On the other hand, in the projection display devices 1, 1001, and 1002 in the first embodiment, the optical path of light from the excitation light sources is separated from the optical path of blue light. In the projection display devices 1, 1001, and 1002, light is guided from the blue light source (blue light source group 100B) to the light intensity equalizing element 113. Thus, the projection display devices 1, 1001, and 1002 in the first embodiment allow the optical path of the blue light from the blue light source (blue light source group 100B) to the light intensity equalizing element 113 to be shortened. The projection display devices 1, 1001, and 1002 have an advantage of allowing the projection optical system 124 to be made compact.

<Reduction of Speckle by Light Diffusion Element>

In the projection display devices 1, 1001, and 1002 in the first embodiment, a light diffusion element is disposed in the optical path from the blue light source group 100B to the light intensity equalizing element 113. This can reduce laser speckle. Further, the light diffusion element increases the sizes of the light beam diameters of light beams reaching the light intensity equalizing element 113, and thus can improve uniformity of blue brightness distribution on the emitting end surface 113*o* of the light intensity equalizing element 113. Further, since the incident light is dispersed on the incident end surface 113*i* of the light intensity equalizing element 113, temperature rise of the incident end portion can be reduced. Here, "speckle" refers to spotty brightness unevenness due to coherence of laser light. The speckle is reduced by disposing a light diffusion element between the light source and the light intensity equalizing element or between the light intensity equalizing element and the light valve.

In the first embodiment, as illustrated in FIGS. 1, 4, and 5, the light diffusion element is disposed between the condensing optical system 112 and the light intensity equalizing element 113. The first embodiment employs the rotary diffusion plate 100D as the light diffusion element. Although the following description refers to FIG. 1, the same applies to FIGS. 4 and 5.

The rotary diffusion plate 100D will now be described. As described above, the speckle is reduced by disposing a light diffusion element between the blue light source group 100B and the light intensity equalizing element 113. However, to completely remove the speckle without rotating the light diffusion element, it is necessary to increase the number of light sources and superpose intensity distributions of the multiple light sources. For example, it is necessary to use twenty or more light sources. The speckle can be greatly reduced by increasing the degree of diffusion of the light diffusion element. However, this increases a divergence angle of a light beam and thus lowers the light use efficiency, which is undesirable. Here, "degree of diffusion" refers to the degree of spread of a light beam when the light beam passes through or is reflected by the light diffusion element.

In the first embodiment, a case where the blue light source group 100B is composed of five or seven light sources will be described. In this case, brightness distributions are temporally integrated by rotation of the light diffusion element between the blue light source group 100B and the light intensity equalizing element 113. This can reduce the speckle.

In view of durability and thermal resistance, the rotary diffusion plate 100D is preferably made of glass. A glass plate is given a diffusion function by surface treatment. An example of the surface treatment is a treatment to roughen a surface of the glass plate. Further, the diffusion plate is rotated to reduce the speckle. If the rotational speed is low, the reduction of the speckle is small. The rotary diffusion plate 100D preferably rotates at a rotational speed of 3600 rpm or higher.

The rotary diffusion plate 100D is preferably disposed at the position at which the light beam from the light source S4 passes through the optical axis C3 in FIG. 13(B). This position is a position at which blue lights emitted from the respective light sources 100B1, 100B2, 100B3, 100B4, and 100B5 of the blue light source group 100B reach the vicinity of the optical axis C3. That is, the position at which the light beam from the light source S4 passes through the optical axis C3 is a light concentration position of the blue lights. The diameter of a light beam of the blue lights is small at the position at which the light beam from the light source S4 passes through the optical axis C3.

The red light emitted from the red light source 100R and the green light emitted from the phosphor element 100G are concentrated on the incident end surface 113i of the light intensity equalizing element 113. Thus, regarding the red light and green light, the light beam sizes are larger between the condensing optical system 112 and the light intensity equalizing element 113 than on the incident end surface 113i. While the above-described light concentration position of the blue lights is a position at which the size of the light beams emitted from the blue light source group 100B is minimum, it is not a position at which the sizes of the light beams emitted from the red light source 100R and phosphor element 100G are minimum.

FIGS. 15(A), 15(B), and 15(C) are diagrams schematically illustrating light beams on the rotary diffusion plate 100D. Here, a distance between the rotary diffusion plate 100D and the light intensity equalizing element 113 in FIG. 1 is 5 mm, for example. FIG. 15(A) illustrates a red light beam 130R emitted from the red light source 100R. FIG. 15(B) illustrates a green light beam 130G emitted from the phosphor element 100G. FIG. 15(C) illustrates a blue light beam 130B emitted from the blue light source group 100B. FIGS. 15(A), 15(B), and 15(C) each indicate the incident end surface 113i of the light intensity equalizing element 113 with a dashed line. Each of FIGS. 15(A), 15(B), and 15(C) illustrates a light beam on the –Z axis direction side of the light intensity equalizing element 113, and thus indicates the light beam with a solid line and the light intensity equalizing element 113 with a dashed line. FIGS. 15(A), 15(B), and 15(C) show that the size of the blue light beam emitted from the blue light source 100B is the smallest.

Figure 16:
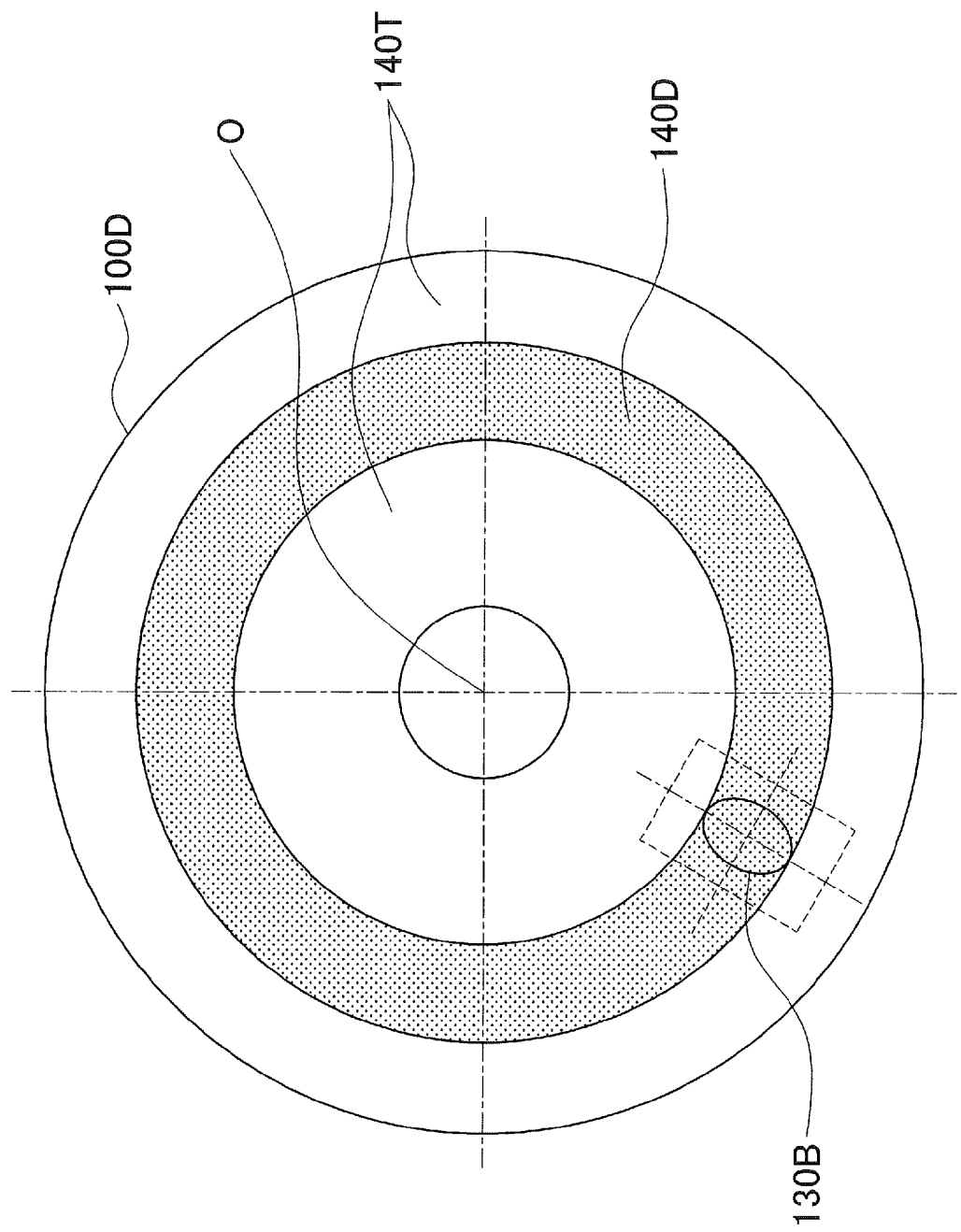
FIG. 16 is a schematic diagram illustrating a diffusing area of the rotary diffusion plate.

FIG. 16 is a schematic diagram illustrating the configuration of the rotary diffusion plate 100D. The rotary diffusion plate 100D is a circular plate. The rotary diffusion plate 100D has a disk shape. A diffusing area 140D is formed in a ring shape centered at a rotational center O of the rotary diffusion plate 100D. The position of the diffusing area 140D in the radial direction is determined so that the light beam 130B constantly passes through the diffusing area 140D. The edge of the light beam 130B on the rotational center O side corresponds to the inner diameter of the diffusing area 140D. The edge of the light beam 130B on the opposite side of the rotational center O corresponds to the outer circumference of the diffusing area 140D. The area of the rotary diffusion plate 100D other than the diffusing area 140D is a non-light-diffusing area 140T. "Non-light-diffusing area" refers to an area in which a divergence angle of incident light and a divergence angle of emitted light are equal to each other.

Thereby, the speckle of the light beam 130B emitted from the blue light source group 100B can be reduced. This is because the light beam 130B constantly passes through the diffusing area 140D. Regarding each of the other light beams 130R and 130G, only a part of the light beam is diffused, and thus the reduction of light use efficiency due to light diffusion is small. This is because, regarding each of the light beams 130R and 130G, while a part of the light beam passes through the diffusing area 140D and is diffused, the other part of the light beam passes through the non-light-diffusing area 140T and is not diffused. The distance between the rotary diffusion plate 100D and the light intensity equalizing element 113 is not limited to 5 mm, and may be, for example, 10 mm. If the distance between the rotary diffusion plate 100D and the light intensity equalizing element 113 is small, the advantage is small. Thus, it is preferably 5 mm or more.

Figure 17:
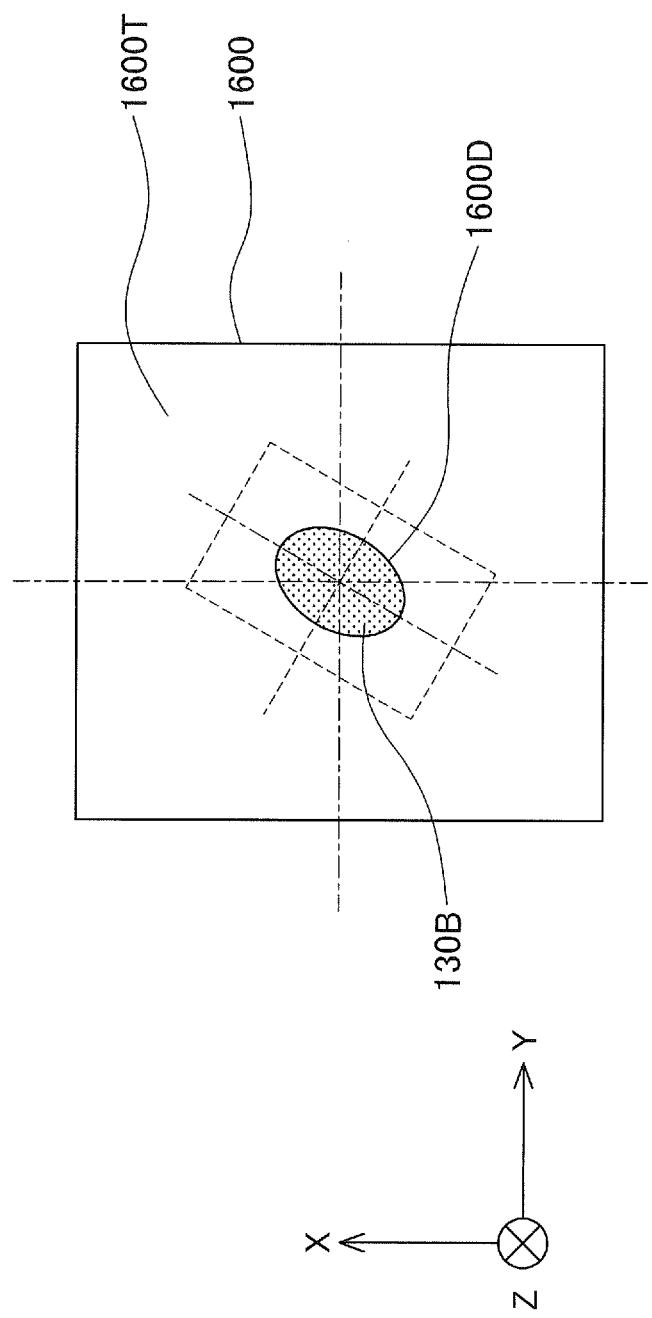
FIG. 17 is a schematic diagram illustrating a diffusing area of a light diffusion element.

FIG. 17 is a schematic diagram illustrating the configuration of the light diffusion element 1600 that is not rotated. As illustrated in FIG. 17, the light diffusion element 1600 has, only at a position through which the light beam 130B passes, a diffusing area 1600D that diffuses light. The diffusing area 1600D has a high degree of diffusion, which is different from that of the diffusing area 140D of the rotary diffusion plate 100D. The area of the light diffusion element 1600 other than the diffusing area 1600D is a non-light-diffusing area 1600T. Like the rotary diffusion plate 100D, the light diffusion element 1600 can reduce the speckle of the light beam 130B emitted from the blue light source group 100B. Further, the light diffusion element 1600 can reduce decrease in light use efficiency due to diffusion of the light beams 130R and 130G.

The above description illustrates a configuration in which the rotary diffusion plate 100D or light diffusion element 1600 transmits light. However, the same advantage can be obtained even when the rotary diffusion plate 100D or light diffusion element 1600 is configured to reflect light. Specifically, the diffusing area 140D or 1600D is an area that diffuses and reflects light, and the area 140T or 1600T is an area that specularly reflects light. In specular reflection, the reflection angle is equal to the incident angle.

Further, in the above description, the non-light-diffusing area 140T or 1600T transmits light as it is. "Transmits light as it is" refers to transmitting light in such a manner that a divergence angle of the emitted light is equal to a divergence angle of the incident light. However, the non-light-diffusing area 140T or 1600T may be an area having a degree of diffusion smaller than that of the diffusing area 140D or 1600D. Such a configuration also can reduce decrease in light use efficiency as compared to a case where all the light is incident on the diffusing area 140D or 1600D. However, the degree of reduction of decrease in light use efficiency is low as compared to a case where the non-light-diffusing area 140T or 1600T is used. That is, the light use efficiency is low as compared to a case where the non-light-diffusing area 140T or 1600T is used.

Further, the above description illustrates light emitted by the LED and phosphor as light that has small coherence and requires no consideration of the influence of speckle. However, for example, a part of light that has small coherence and generates slight speckle may be incident on the area 140T or 1600T having a degree of diffusion smaller than that of the diffusing area 140D or 1600D. This can reduce the speckle while reducing decrease in light use efficiency. "Light that has small coherence and generates slight speckle" includes laser light with reduced coherence.

The rotary diffusion plate 100D is a rotating light diffusion element. The rotary diffusion plate 100D is an example of the light diffusion element.

As described above, disposing a light diffusion element having a high degree of diffusion reduces light use efficiency, which is not preferable. However, the light diffusion element 1600 in FIG. 17 has a high degree of diffusion only in the area 1600D, which is set in view of the size of the light beam 130B from the blue light source group 100B. Thus, the light diffusion element 1600 can reduce decrease in light use efficiency of the other light beams 130R and 130G. Further, the light diffusion element 1600 can reduce the speckle without being rotated. This eliminates the need for a driving unit for rotating a diffusion plate and simplifies the configuration of the device, allowing the device to be downsized and assembled more efficiently. It is also possible to reduce the number of parts and improve the assemblability.

In the first embodiment, the lasers are used in the blue light source 100B. Thus, an optical system with high light use efficiency can be achieved. Further, since the optical system from the light source 100B to the light intensity equalizing element 113 is composed of the collimator lens 107 and the two condensing lenses 95 and 112, the product can be downsized.

In the first embodiment, the phosphor element 100G is used as a green light source. The LED is used as the red light source 100R. However, the same advantage is obtained even when lasers are used as the green and red light sources. In this case, it is preferable that light sources are disposed in an equilateral triangular arrangement similarly to the blue light source group 100B in the first embodiment. A case where the red light source 200R are lasers has been described with reference to FIG. 4. This description has indicated that the light sources are preferably arranged with a concept similar to that for the blue light source group 100B illustrated in FIG. 9 or 14. It is necessary that the collimator lenses are eccentric toward the optical axis and the lights are concentrated in front of the light intensity equalizing element 113. Some of the advantages are obtained only when lasers are used for one or two colors. Specifically, when a light beam of at least one color is concentrated on the incident end surface 113i of the light intensity equalizing element 113 and light beams of laser light sources of the other one or more colors are concentrated before the light intensity equalizing element 113, the advantages of reducing the speckle and reducing decrease in light use efficiency are obtained.

At least one of the three light sources is an LED or a phosphor. A light beam from the LED or phosphor is concentrated on the incident surface 113i of the light intensity equalizing element 113. Thus, regarding the light beam from the LED or phosphor, the size of the light beam diameter is minimum on the incident end surface 113i. On the other hand, regarding the other one or more light sources (lasers), the size of the light beam diameter is smaller at a position in front of the light intensity equalizing element 113 than on the incident end surface 113i. This makes it possible to reduce decrease in light use efficiency of the LED or phosphor and reduce the speckle.

The invention according to the first embodiment is applicable to a projection display device using a prism as disclosed in Japanese Patent Application Publication No. 2002-139698. As in the first embodiment, by using lasers and arranging light beams on the incident end surface 113i of the light intensity equalizing element 113 in an equilateral triangular arrangement, the brightness is improved while the temperature rise is reduced. Further, with a simple configuration in which the optical axes of the collimator lenses are displaced from the optical axes of the light sources, it becomes possible to give anisotropy to angle distribution and easily improve the light use efficiency. Here, "anisotropy" refers to a characteristic that in angle distribution of light incident on the light intensity equalizing element 113, an incident angle in the long side direction is large and an incident angle in the short side direction is small.

In the first embodiment, as illustrated in FIG. 9, the light sources 100B1, 100B2, 100B3, 100B4, and 100B5 of the blue light source group 100B are disposed in an equilateral triangular arrangement. However, these light sources may be disposed in an isosceles triangular arrangement. The multiple light sources 100B1, 100B2, 100B3, 100B4, and 100B5 are in an isosceles triangular arrangement. In this case, the distance (the distances m1 and m2 in FIG. 9) in the short side direction is maintained, and the distance (the distances n1, n2, and n7 in FIG. 9) in the long side direction is lengthened. Thus, isosceles triangles with the distances n3, n4, n5, and n6 equal to each other are formed. The distances n3, n4, n5, and n6 correspond to the equal sides of the isosceles triangles. On the other hand, the distances n1, n2, and n7 correspond to the bases of the isosceles triangles. Thereby, although the incident angle of a light beam incident on the light intensity equalizing element 113 from the long side direction is increased, since the distances between the respective light sources are widened, a configuration advantageous for cooling the blue light source group 100B is obtained. Thus, if an effective angle of a light beam incident from the long side direction allows, an isosceles triangular arrangement may be adopted. Regarding the arrangement of the light source group, as long as the distance in the short side direction is smaller than the distance in the long side direction, any light source arrangement can improve the light use efficiency. However, an equilateral triangular arrangement is optimum for both cooling and light use efficiency.

The first embodiment uses one light valve. However, the advantages of reducing the speckle and reducing decrease in light use efficiency are also obtained in a configuration using three light valves. This configuration requires a prism that is disposed before the light valves and combines light beams of the respective colors, or other such means.

As above, the projection display device 1 includes the light source group 100B, at least one collimator lens 107, condensing optical system 95, 112, and light intensity equalizing element 113. The light source group 100B includes multiple first light sources 110B each emitting a first light to be projected. The at least one collimator lens 107 converts the respective first lights into parallel light beams and emits the parallel light beams. The condensing optical system 95, 112 receives the respective parallel light beams and emits concentrated light beams. The light intensity equalizing element 113 receives the concentrated light beams through the incident end surface 113*i* and emits light having a light intensity distribution with enhanced uniformity. The parallel light beams are incident at different positions of the condensing optical system 95, 112 on a plane perpendicular to the optical axis of the condensing optical system 95, 112. The emitting positions of the concentrated light beams on the emitting surface of the condensing optical system 95, 112 and the incident positions of the concentrated light beams on the incident end surface 113*i* of the light intensity equalizing element 113 are opposite each other with respect to the optical axis of the condensing optical system 95, 112. Here, "light having a light intensity distribution with enhanced uniformity" refers to light having a light intensity distribution more flat than that of light incident on the incident end surface 113*i*. The light intensity equalizing element 113 converts light incident on the incident end surface 113*i* into light having a light intensity distribution more flat than that of the incident light and emits it from the emitting end surface 113*o*.

The incident positions of the concentrated light beams on the light intensity equalizing element 113 are separated from each other on the incident end surface 113*i*.

The incident positions of the concentrated light beams on the light intensity equalizing element U11511113 are arranged in an equilateral triangular arrangement on the incident end surface 113*i*.

The multiple light sources are arranged in an equilateral triangular arrangement.

The multiple light sources are arranged in an isosceles triangular arrangement.

The at least one collimator lens 107 includes multiple collimator lenses 107 arranged corresponding to each of the multiple first light sources 110B. At least one of the collimator lenses 107 is eccentric to the optical axis of the corresponding first light source 110B.

The at least one collimator lens 107 includes multiple collimator lenses 107 arranged corresponding to each of the multiple first light sources 110B. At least one of the collimator lenses 107 is eccentric to the optical axis of the corresponding first light source 110B. The direction of the eccentricity of the collimator lens 107 is a direction toward a center of the light source group 100B.

The projection display device 1 further includes the second light source 100R or 100G, and the light diffusion element 100D or 1600. The second light source 100R or 100G is different from the first light sources 110B and emits a second light less coherent than the first lights. The light diffusion element 100D or 1600 is disposed between the condensing optical system 112 and the light intensity equalizing element 113, receives the concentrated light beams and the second light as incident light, and diffuses the incident light to emit the diffused light as emitted light. The light diffusion element 100D or 1600 has the first area 140D or 1600D that diffuses the incident light and the second area 140T or 1600T having a degree of diffusion smaller than a degree of diffusion of the first area 140D or 1600D. The light beam diameter of the second light incident on the light diffusion element 100D or 1600 is larger than the light beam diameter of the concentrated light beams incident on the light diffusion element 100D or 1600. The concentrated light beams are incident on the first area 140D or 1600D. The second light is incident on the first area 140D or 1600D and the second area 140T or 1600T. All the concentrated light beams are incident on the first area 140D or 1600D.

The second area 140T or 1600T may be configured so that a divergence angle of the incident light and a divergence angle of the emitted light are equal to each other. "A divergence angle of the incident light and a divergence angle of the emitted light are equal to each other" refers to transmission of light without diffusion.

The light diffusion element 100D rotates.

The projection display device 1 further includes the light valve 121 and projection lens 124. The light valve 121 receives the light with enhanced uniformity and emits modulated light. The projection lens 124 magnifies and projects the modulated light. A center axis of the light valve 121 and an optical axis of the projection lens 124 do not coincide with each other.

The projection display device 1 further includes the relay optical system 115, 120, and 122 that guides, to the light valve 121, the light with enhanced uniformity emitted from the light intensity equalizing element 113.

The first light sources 110B are blue light sources and have peak wavelengths of 460 nm or more.

As described above, the projection display device 1 includes a light source group 100G, 100B, and 100R. The projection display devices 1001 and 1002 include a light source group 1000, 100B, and 200R. The light source group includes multiple light sources that emit lights to be projected. The projection display devices 1, 1001, and 1002 include a light diffusion element 100D or 1600. The light diffusion element 100D or 1600 has the first area 140D or 1600D that diffuses light and the second area 140T or 1600T having a degree of diffusion smaller than a degree of diffusion of the first area 140D or 1600D. The multiple lights include first lights (e.g., laser lights) having strong coherence and a second light (e.g., light emitted from the LED or phosphor) less coherent than the first lights. The size of the light beam of the second light (e.g., light emitted from the LED or phosphor) incident on the light diffusion element 100D or 1600 is larger than the size of the light beam of the first lights (e.g., laser lights). All the first lights (e.g., laser lights) are incident on the first area 140D or 1600D; a part of the second light (e.g., light emitted from the LED or phosphor) is incident on the first area 140D or 1600D; the other light is incident on the second area 140T or 1600T. Although light emitted from the LED or phosphor is illustrated as an example of the second light, the second light may be laser light with reduced coherence.

The above embodiment uses terms, such as "parallel" or "perpendicular", indicating positional relationships between parts or the shapes of parts. These terms are intended to include ranges taking account of manufacturing tolerances, assembly variations, or the like. Thus, recitations in the claims indicating positional relationships between parts or the shapes of parts are intended to include ranges taking account of manufacturing tolerances, assembly variations, or the like.

The present invention is not limited to the embodiments described above.

REFERENCE CHARACTERS

1, 1001, 1002 projection display device, 3 controller, 11, 12, 13, 21, 22, 23, 31, 32, 33, 41, 42, 43, 51, 52, 53 excitation light source, 100A excitation light source unit, 15, 16, 17, 25, 26, 27, 35, 36, 37, 45, 46, 47, 55, 56, 57 collimator lens, 90, 101 lens group, 210 collimator lens group, 80 light reflecting element, 81, 82, 83, 84, 85 light reflecting mirror, 220, 230 light reflecting mirror group, 104 condensing lens group, 94, 111 color separation filter, 95, 96, 112 condensing optical system, 100R, 200R, 210R red light source, 100B blue light source group, 110B, 100B1, 100B2, 100B3, 100B4, 100B5, 101B1, 101B2, 101B3, 101B4, 101B5 light source, 100G phosphor element, 100E excitation light source group, 107, 1071, 1072, 1073, 1074, 1075, 1076, 1077, 1078, 1079, 1080, 207 collimator lens, 113, 1130, 1131 light intensity equalizing element, 113*i* incident end surface, 113*o* emitting end surface, 115 relay lens group, 120 folding mirror, 121 light valve, 122 condensing lens, 124 projection optical system, 124*f* front face, 130R, 130G, 130B light beam, 140D diffusing area, 140T non-light-diffusing area, 150 projection surface, 1600 light diffusion element, 1600D diffusing area, 1600T non-light-diffusing area, 400 shadow, n1, n2, n3, n4, n5, n6, n7, n8, n9, n10, n11, n12, n13, m1, m2, m3, m4, o1, o2 distance, P, Q, R axis, C, C2, OA optical axis, CA, BC, BD center axis, a1, a2, a3, a4, b incident angle, B0, B1, B2, B3, B4, B5 light beam, Ro projection light, VS image signal, MC modulation control signal, M magnification ratio.

What is claimed is:

1. A projection device comprising:
   a light source group including a plurality of first light sources each emitting a first light to be projected;
   at least one collimator lens that converts the respective first lights into parallel light beams and emits the parallel light beams;
   a condensing optical system that receives the respective parallel light beams and emits concentrated light beams; and
   an optical element having an incident surface through which the concentrated light beams enters the optical element,
   wherein the condensing optical system is configured so that when a light beam parallel to an optical axis of the condensing optical system is incident on the condensing optical system, the light beam is concentrated at a position on the optical axis of the condensing optical system on the incident surface of the optical element;
   wherein the parallel light beams emitted from the at least one collimator lens are inclined to the optical axis of the condensing optical system and are incident at different positions of the condensing optical system on a plane perpendicular to an optical axis of the condensing optical system while approaching the optical axis of the condensing optical system; and
   wherein emitting positions of the concentrated light beams on an emitting surface of the condensing optical system and incident positions of the concentrated light beams on the incident surface of the optical element are opposite each other with respect to the optical axis of the condensing optical system.

2. The projection device of claim 1, wherein the incident positions of the concentrated light beams on the optical element are separated from each other on the incident surface.

3. The projection device of claim 1, wherein the incident positions of the concentrated light beams on the optical element are arranged in an equilateral triangular arrangement on the incident end-surface.

4. The projection device of claim 1, wherein the plurality of first light sources are arranged in an equilateral triangular arrangement.

5. The projection device of claim 1, wherein the plurality of first light sources are arranged in an isosceles triangular arrangement.

6. The projection device of claim 1, wherein the at least one collimator lens comprises a plurality of collimator lenses arranged corresponding to each of the plurality of first light sources, and
   wherein at least one of the plurality of collimator lenses is eccentric to an optical axis of the corresponding first light source.

7. The projection device of claim 6, wherein the direction of the eccentricity is an direction toward a center of the light source group.

8. The projection device of claim 1, further comprising:
   a light valve that receives light incident on the optical element and emits modulated light; and
   a projection lens that magnifies and projects the modulated light,
   wherein a center axis of the light valve and an optical axis of the projection lens do not coincide with each other.

9. The projection device of claim 8, further comprising a relay optical system that receives the light incident on the optical element and guides the received light to the light valve.

10. The projection device of claim 1, wherein the first light sources are blue light sources and have peak wavelengths of 460 nm or more.

11. The projection device of claim 1, wherein the optical element is a light guiding element that guides the concentrated light beams incident on the incident surface.

12. The projection device of claim 1, wherein the optical element is a light intensity equalizing element that enhances uniformity of light intensity distribution of the concentrated light beams incident on the incident surface.

13. The projection device of claim 1, further comprising a second light source that is different from the first light sources and emits a second light less coherent than the first lights,
   wherein a light beam emitted from the second light source is concentrated at the position on the optical axis of the condensing optical system on the incident surface of the optical element.

14. The projection device of claim 13, wherein the first light sources are lasers and the second light source is a phosphor or a light emitting diode.

15. The projection device of claim 13, further comprising a light diffusion element that is disposed between the condensing optical system and the optical element, receives the concentrated light beams and the second light as incident light, and diffuses the incident light to emit the diffused light as emitted light, wherein:
   the light diffusion element has a first area that diffuses the incident light and a second area having a degree of diffusion smaller than a degree of diffusion of the first area;
   a light beam diameter of a light beam of the second light incident on the light diffusion element is larger than a light beam diameter of the concentrated light beams incident on the light diffusion element;
   the concentrated light beams are incident on the first area; and
   the second light is incident on the first area and the second area.

16. The projection device of claim 15, wherein the second area is configured so that a divergence angle of incident light and a divergence angle of emitted light are equal to each other.

17. The projection device of claim 15 wherein the light diffusion element rotates.

* * * * *